(12) United States Patent
Niu et al.

(10) Patent No.: US 12,526,221 B2
(45) Date of Patent: Jan. 13, 2026

(54) COMMUNICATION METHOD, UP DEVICE, AND CP DEVICE

(71) Applicant: Huawei Technologies Co., Ltd., Shenzhen (CN)

(72) Inventors: Chengguang Niu, Beijing (CN); Zhouyi Yu, Beijing (CN); Hongtao Guo, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 481 days.

(21) Appl. No.: 18/054,645

(22) Filed: Nov. 11, 2022

(65) Prior Publication Data

US 2023/0122810 A1 Apr. 20, 2023

Related U.S. Application Data

(63) Continuation of application No. PCT/CN2020/136607, filed on Dec. 15, 2020.

(30) Foreign Application Priority Data

May 12, 2020 (CN) .......................... 202010400144.1
Jun. 30, 2020 (CN) .......................... 202010614416.8

(51) Int. Cl.
*H04L 45/02* (2022.01)
*H04L 41/00* (2022.01)
(Continued)

(52) U.S. Cl.
CPC .............. *H04L 45/02* (2013.01); *H04L 41/00* (2013.01); *H04L 45/54* (2013.01); *H04L 45/645* (2022.05); *H04L 45/655* (2022.05); *H04W 40/24* (2013.01)

(58) Field of Classification Search
CPC ......... H04L 45/02; H04L 41/00; H04L 45/54; H04L 45/645; H04L 45/655; H04L 12/12;
(Continued)

(56) References Cited

U.S. PATENT DOCUMENTS

2019/0141169 A1 5/2019 Ni et al.
2020/0100319 A1 3/2020 Talebi Fard et al.
(Continued)

FOREIGN PATENT DOCUMENTS

CN 109167670 A 1/2019
CN 110557791 A 12/2019
(Continued)

OTHER PUBLICATIONS

Working Text (WT) 459 Control and User Plane Separation for disaggregated BNG Draft CONTRIB-21341, Broadband Forum, Nov. 2019 (Year: 2019).*
(Continued)

*Primary Examiner* — Charles C Jiang
*Assistant Examiner* — Margaret Marie Anderson
(74) *Attorney, Agent, or Firm* — Slater Matsil, LLP

(57) ABSTRACT

This application provides a communication method, a UP device, and a CP device, and pertains to the field of communications technologies. In the method, the UP device reports interface information to the CP device by using PFCP. Specifically, the UP device carries the interface information in a PFCP message, and transmits the PFCP message to the CP device. The CP device can obtain the interface information of the UP device from the PFCP message, which ensures that the CP device can sense the interface information of the UP device.

20 Claims, 19 Drawing Sheets

(51) Int. Cl.
    *H04L 45/00*      (2022.01)
    *H04L 45/645*     (2022.01)
    *H04L 45/655*     (2022.01)
    *H04W 40/24*      (2009.01)

(58) Field of Classification Search
    CPC ............ H04L 12/2859; H04L 12/2861; H04L 12/287; H04L 45/64; H04L 63/0876; H04L 12/2898; H04L 12/4641; H04L 41/0823; H04W 12/06
    See application file for complete search history.

(56) References Cited

U.S. PATENT DOCUMENTS

| | | | | |
|---|---|---|---|---|
| 2021/0051564 | A1* | 2/2021 | Muley | H04L 67/142 |
| 2021/0281664 | A1* | 9/2021 | Suryanarayanarao | H04M 15/66 |

FOREIGN PATENT DOCUMENTS

| | | |
|---|---|---|
| CN | 110830356 A | 2/2020 |
| WO | 2019162378 A1 | 8/2019 |

OTHER PUBLICATIONS

Huawei, "Pseudo-CR on CP support of F-TEID allocation in UP", 3GPP TSG CT4 Meeting #78, C4-173067, Zhangjiajie, P.R. China; May 15-19, 2017, 2 pages.

3GPP TS 23.007 V16.1.0 (Mar. 2020), 3rd Generation Partnership Project; Technical Specification Group Core Network and Terminals;Restoration procedures; (Release 16), 109 pages.

3GPP TS 29.244 V16.3.1 (Apr. 2020), 3rd Generation Partnership Project; Technical Specification Group Core Network and Terminals; Interface between the Control Plane and the User Plane Nodes; Stage 3 (Release 16), 297 pages.

3GPP TS 29.281 V16.0.0 (Dec. 2019), 3rd Generation Partnership Project;Technical Specification Group Core Network and Terminals; General Packet Radio System (GPRS) Tunnelling Protocol User Plane (GTPv1-U)(Release 16), 33 pages.

Broadband Forum, Technical Report, "TR-101-Migration to Ethernet-Based Broad band Aggregation", Issue: 2, Issue Date: Jul. 2011, 101 pages.

Broadband Forum, Technical Report, "TR-384-Cloud Central Office Reference Architectural Framework", Issue: 1, Issue Date: Jan. 2018, 80 pages.

Broadband Forum, Technical Report, "TR-489-ONU Authentication and Selection of eOMCI or vOMCI", Issue: 1, Issue Date: Jun. 2023, 40 pages.

Peter Schmitt et al., "Control and User Plane Separation of EPC nodes (CUPS)," 3GPP News & Events, https://www.3gpp.org/news-events/3gpp-news/cups, Jul. 26, 2017, 4 pages.

* cited by examiner

COMMUNICATION METHOD, UP DEVICE, AND CP DEVICE

CROSS-REFERENCE TO RELATED APPLICATIONS

This application is a continuation of International Application No. PCT/CN2020/136607, filed on Dec. 15, 2020, which claims priority to Chinese Patent Application No. 202010400144.1, filed on May 12, 2020 and Chinese Patent Application No. 202010614416.8, filed on Jun. 30, 2020. All of the aforementioned patent applications are hereby incorporated by reference in their entireties.

TECHNICAL FIELD

This application relates to the field of communication technologies, and in particular, to a communication method, a UP device, and a CP device.

BACKGROUND

A broadband network gateway (BNG) is an access gateway oriented to a broadband network. When a terminal accesses a network, the BNG is responsible for authentication and internet protocol (IP) address allocation, to connect the terminal to a broadband network. Functions of the BNG are classified into a control plane and a forwarding plane. The control plane provides services such as access management, session management, authentication, authorization, accounting (AAA), address allocation, and service policy control. The forwarding plane performs forwarding processing such as sending an access protocol packet to the control plane and forwarding, to a terminal, a control packet destined to the terminal sent by the control plane.

The BNG can adopt an architecture of control plane and user plane separation (CU separation). When a CU separation architecture is used, a control plane and a forwarding plane of the BNG are separated. Specifically, a BNG with CU separation includes a control plane (CP) device and a user plane (UP) device. The CP device mainly functions as the control plane, and the UP device mainly functions as the forwarding plane.

The UP device includes a plurality of interfaces. However, currently the CP device in the BNG with the CU separation architecture cannot know information about an interface on a UP device. Insufficiency of interface information leads to limitation on functions of the CP device, for example, the CP device cannot control access subscribers.

SUMMARY

Embodiments of this application provide a communication method, a UP device, and a CP device, to resolve, to some extent, limitation on functions caused by insufficiency of interface information obtained by a CP device. The technical solution is as follows.

According to a first aspect, a communication method is provided. The method is applied to a network in which a CP and a UP are separated. The network includes a UP device and a CP device. In the method, the UP device generates a first packet forwarding control protocol (PFCP) message based on an interface on the UP device. The first PFCP message includes information about the interface on the UP device, and the information about the interface includes an index of the interface. The UP device sends the first PFCP message to the CP device.

The foregoing provides a method in which the UP device reports interface information to the CP device by using PFCP. The UP device carries the interface information in a PFCP message, and transfers the PFCP message to the CP device. The CP device can obtain the interface information of the UP device from the PFCP message, which ensures that the CP device can sense the interface information of the UP device. Therefore, limitation on functions caused by insufficient interface information obtained by the CP device is resolved to some extent, helping the CP device implement various functions by using the interface information of the UP device, for example, controlling an access subscriber, generating an option 82 in a dynamic host configuration protocol (DHCP) packet based on the interface information, or restricting a quantity of terminals connected to the interface on the UP device based on a bandwidth of the interface.

Optionally, the network includes a BNG or a broadband remote access server (BRAS), and the BNG or BRAS includes the CP device and the UP device.

Optionally, the first PFCP message is a PFCP report request message, and the second PFCP message is a PFCP report response message.

Optionally, the interface includes a first interface accessed by a terminal on the UP device.

The UP device carries information about the interface accessed by the terminal in a PFCP message, and transfers the PFCP message to the CP device, so that the CP device senses the information about the interface accessed by the terminal on the UP device, which meets a requirement of the CP device to manage the terminal based on the interface information. For example, a location that the terminal accesses is identified based on the information about the interface accessed by the terminal, and the terminal is authenticated based on the location that the terminal accesses.

Optionally, the first PFCP message includes an interface index information element (IE), and the interface index IE includes the index of the interface.

A new type of IE is expanded to carry the index of the interface, so that a format of the IE in the PFCP message is reused to report the interface index to the CP device, a solution in which the UP device reports interface information is more smoothly integrated with a PFCP architecture, and complexity of implementing the solution and configuration is reduced.

Optionally, the information about the interface further includes a type of the interface, the type of the interface includes a physical interface, a bundled interface, a virtual Ethernet interface, or a tunnel interface, the first PFCP message includes an interface type IE, and the interface type IE includes the type of the interface.

The UP device carries the type of the interface in the PFCP message, and transfers the PFCP message to the CP device, so that the CP device can sense the type of the interface on the UP device, which helps the CP device manage a terminal based on the type of the interface, improves flexibility, and meets a requirement for an application scenario in which the CP device needs to use the interface type to perform network services.

Optionally, the information about the interface further includes a bandwidth of the interface, the first PFCP message includes a bandwidth IE, and the bandwidth IE includes the bandwidth of the interface.

The UP device carries the bandwidth of the interface in the PFCP message, and transfers the PFCP message to the CP device, so that the CP device can sense the bandwidth of the interface on the UP device, which meets a requirement for an application scenario in which the CP device needs to use the bandwidth of the interface to perform network services. For example, the CP device can use the bandwidth of the interface to implement a port bandwidth control function.

Optionally, the information about the interface further includes a slot number of a slot in which the interface is located, the first PFCP message includes a slot IE, and the slot IE includes the slot number.

The UP device carries the slot number of the interface in the PFCP message, and transfers the PFCP message to the CP device, so that the CP device can sense the slot number of the interface on the UP device, which meets a requirement for an application scenario in which the CP device needs to use the slot number to perform network services. For example, the CP device may carry the slot number in a remote authentication dial-in authentication service (Remote Authentication Dial In User Service, RADIUS) authentication packet, and send the slot number to a RADIUS server. The RADIUS server obtains the slot number from the RADIUS authentication packet. This meets a requirement for the RADIUS server to perform RADIUS authentication based on the slot number. For example, the CP device may carry the slot number in a DHCP option 82 field and send to a DHCP server. The DHCP server obtains the slot number from the DHCP option 82 field. This meets a requirement for the DHCP server to perform authentication based on the slot number.

Optionally, the information about the interface further includes a card number of an interface card on which the interface is located, the first PFCP message includes a card IE, and the card IE includes the card number.

The UP device carries the card number of the interface in the PFCP message, and transfers the PFCP message to the CP device, so that the CP device can sense the card number of the interface on the UP device, which meets a requirement for an application scenario in which the CP device needs to use the card number to perform network services. For example, the CP device can carry the card number in a RADIUS authentication packet, and send the RADIUS authentication packet to a RADIUS server. The RADIUS server obtains the card number from the RADIUS authentication packet. This meets a requirement for the RADIUS server to perform RADIUS authentication based on the card number. For example, the CP device may carry the card number in a DHCP option 82 field and send to a DHCP server. The DHCP server obtains the slot number from the DHCP option 82 field. This meets a requirement for the DHCP server to perform authentication based on the card number.

Optionally, the information about the interface further includes a port number corresponding to the interface, the first PFCP message includes a port IE, and the port IE includes the port number.

The UP device carries the port number of the interface in the PFCP message, and transfers the PFCP message to the CP device, so that the CP device can sense the port number of the interface on the UP device, which meets a requirement for an application scenario in which the CP device needs to use the port number to perform network services. For example, the CP device can carry the port number in a RADIUS authentication packet, and send the RADIUS authentication packet to a RADIUS server. The RADIUS server obtains the port number from the RADIUS authentication packet. This meets a requirement for the RADIUS server to perform RADIUS authentication based on the port number. For example, the CP device may carry the port number in a DHCP option 82 field and send to a DHCP server. The DHCP server obtains the port number from the DHCP option 82 field. This meets a requirement for the DHCP server to perform authentication based on the card number.

Optionally, the information about the interface further includes an index of a sub-interface of the interface, the first PFCP message includes a sub-interface index IE, and the sub-interface index IE includes the index of the sub-interface.

The UP device carries the index of the sub-interface of the interface in the PFCP message, and transfers the PFCP message to the CP device, so that the CP device can sense the index of the sub-interface on the UP device, which meets a requirement for an application scenario in which the CP device needs to use the index of the sub-interface to perform network services. For example, this facilitates the CP device to plan parameters, for example, to set bandwidth parameters and authentication policies, for different clients via sub-interfaces.

Optionally, the interface is a logical interface, the information about the interface further includes an interface number of the logical interface, the first PFCP message includes a logical interface index IE, and the logical interface index IE includes the interface number of the logical interface.

The UP device carries the interface number of the logical interface in the PFCP message, and transfers the PFCP message to the CP device, so that the CP device can sense the interface number of the logical interface on the UP device, which meets a requirement for an application scenario in which the CP device needs to use an index of a sub-interface to perform network services.

Optionally, the information about the interface further includes a state of the interface, the state of the interface is an up state or a down state, the first PFCP message includes an interface state IE, and the interface state IE includes the state of the interface.

The UP device carries the state of the interface in the PFCP message, and transfers the PFCP message to the CP device, so that the CP device can sense the state of the interface on the UP device, which meets a requirement for an application scenario in which the CP device needs to use the state to perform network services.

Optionally, the information about the interface further includes a maximum transmission unit (MTU) of the interface, the first PFCP message includes an MTU IE, and the MTU IE includes the MTU of the interface.

The UP device carries the MTU of the interface in the PFCP message, and transfers the PFCP message to the CP device, so that the CP device can sense the MTU of the interface on the UP device, which meets a requirement for an application scenario in which the CP device needs to use the MTU of the interface to perform network services. For example, this helps the CP device to apply the MTU of the interface to send a packet to the terminal.

Optionally, the first PFCP message includes a create interface IE, the create interface IE includes the information about the interface and a first IE type, and the first IE type indicates that the interface is newly created.

A new type of IE is expanded to indicate the CP device to create interface information. When the UP device creates a logical link and has a newly added interface, the newly added interface on the UP device can be reported to the CP device by using this type of IE, so that the CP device senses the newly added interface on the UP device. This improves flexibility.

Optionally, the first PFCP message includes an update interface IE, the update interface IE includes the information about the interface and a second IE type, and the second IE type indicates that the information about the interface is updated.

A new type of IE is expanded to indicate the CP device to update interface information. When the state of the interface changes from the up state to the down state due to a failure of the UP device, the change of the state of the interface on the UP device can be reported to the CP device by using this type of IE, so that the CP device senses the change of the state of the interface on the UP device. This facilitates the CP device to perform network services such as offline subscriber processing and accounting stopping triggered by the change of the state of the interface, thereby improving flexibility.

Optionally, the first PFCP message includes a delete interface IE, the delete interface IE includes the information about the interface and a third IE type, and the third IE type indicates that the interface has been deleted.

A new type of IE is expanded to indicate the CP device to delete interface information. When the UP device deletes a logical link and therefore deletes an original interface, the deleted interface on the UP device can be reported to the CP device by using this type of IE, so that the CP device senses the deleted interface on the UP device. This improves flexibility.

Optionally, the first PFCP message is a first PFCP node related message with a first message type, and the first message type indicates that the first PFCP message is used to report the information about the interface on the UP device. Alternatively, optionally, the first PFCP message is a PFCP node report request message.

The UP device reports the information about the interface by reusing the PFCP node report request message, so that the solution is more smoothly integrated with the PFCP architecture, and facilitates inheriting of a communication implementation solution in the PFCP, which reduces complexity for implementing the solution and configuration.

Optionally, after the UP device sends the first PFCP message to the CP device, the method further includes: The UP device receives a second PFCP message from the CP device, where the second PFCP message notifies the UP device that the CP device has received the first PFCP message.

By responding to the PFCP message reporting the interface information, the UP device can determine whether the CP device has successfully received the interface information, which improves reliability of transmitting the interface information.

Optionally, the second PFCP message is a second PFCP node related message with a second message type, and the second message type indicates that the second PFCP message is a response message corresponding to the first PFCP node related message. Alternatively, the second PFCP message is a PFCP node report response message.

According to a second aspect, a communication method is provided. The method is applied to a network in which a CP and a UP are separated. The network includes a UP device and a CP device. The method includes: The CP device receives a first PFCP message from the UP device, where the first PFCP message includes information about an interface on the UP device, and the information about the interface includes an index of the interface. The CP device stores the information about the interface.

Optionally, the interface includes a first interface accessed by a terminal on the UP device, and after the CP device stores the information about the interface, the method further includes: managing the terminal based on the information about the first interface.

Optionally, after the CP device receives the first PFCP message from the UP device, the method further includes: The CP device generates a second PFCP message, where the second PFCP message notifies the UP device that the CP device has received the first PFCP message; and the CP device sends the second PFCP message to the UP device.

Optionally, the first PFCP message includes an interface index IE, and the interface index IE includes the index of the interface.

Optionally, the information about the interface further includes a type of the interface, the type of the interface includes a physical interface, a bundled interface, a virtual Ethernet interface, or a tunnel interface, the first PFCP message includes an interface type IE, and the interface type IE includes the type of the interface.

Optionally, the information about the interface further includes a bandwidth of the interface, the first PFCP message includes a bandwidth IE, and the bandwidth IE includes the bandwidth of the interface.

Optionally, the information about the interface further includes a slot number of a slot in which the interface is located, the first PFCP message includes a slot IE, and the slot IE includes the slot number.

Optionally, the information about the interface further includes a card number of an interface card on which the interface is located, the first PFCP message includes a card IE, and the card IE includes the card number.

Optionally, the information about the interface further includes a port number corresponding to the interface, the first PFCP message includes a port IE, and the port IE includes the port number.

Optionally, the information about the interface further includes an index of a sub-interface of the interface, the first PFCP message includes a sub-interface index IE, and the sub-interface index IE includes the index of the sub-interface.

Optionally, the interface is a logical interface, the information about the interface further includes an interface number of the logical interface, the first PFCP message includes a logical interface index IE, and the logical interface index IE includes the interface number of the logical interface.

Optionally, the information about the interface further includes a state of the interface, the state of the interface is an up state or a down state, the first PFCP message includes an interface state IE, and the interface state IE includes the state of the interface.

Optionally, the information about the interface further includes an MTU of the interface, the first PFCP message includes an MTU IE, and the MTU IE includes the MTU of the interface.

Optionally, the first PFCP message includes a create interface IE, the create interface IE includes the information about the interface and a first IE type, and the first IE type indicates that the interface is newly created.

Optionally, the first PFCP message includes an update interface IE, the update interface IE includes the information about the interface and a second IE type, and the second IE type indicates that the information about the interface is updated.

Optionally, the first PFCP message includes a delete interface IE, the delete interface IE includes the information about the interface and a third IE type, and the third IE type indicates that the interface has been deleted.

Optionally, the first PFCP message is a first PFCP node related message with a first message type, and the first message type indicates that the first PFCP message is used to report the information about the interface on the UP device. Alternatively, optionally, the first PFCP message is a PFCP node report request message.

Optionally, after the UP device sends the first PFCP message to the CP device, the method further includes: The UP device receives a second PFCP message from the CP device, where the second PFCP message notifies the UP device that the CP device has received the first PFCP message.

Optionally, the second PFCP message is a second PFCP node related message with a second message type, and the second message type indicates that the second PFCP message is a response message corresponding to the first PFCP node related message. Alternatively, the second PFCP message is a PFCP node report response message.

According to the third aspect, a UP device is provided, configured to perform the method in any one of the first aspect or any possible design of the first aspect. Specifically, the UP device includes a module configured to perform the method in the first aspect or any possible design of the first aspect.

According to the fourth aspect, a CP device is provided, configured to perform the method in any one of the second aspect or any possible design of the second aspect. Specifically, the CP device includes a module configured to perform the method in the first aspect or any possible design of the first aspect.

According to a fifth aspect, a UP device is provided. The UP device includes a processor and a communication interface. The processor is configured to execute instructions, so that the UP device performs the communication method provided in any one of the first aspect or the optional manners of the first aspect. The communication interface is configured to receive or send a packet. For specific details of the UP device provided in the fifth aspect, refer to any one of the first aspect or the optional manners of the first aspect. Details are not described herein again.

According to a sixth aspect, a CP device is provided. The CP device includes a processor and a communication interface. The processor is configured to execute instructions, so that the CP device performs the communication method provided in any one of the second aspect or the optional manners of the second aspect. The communication interface is configured to receive or send a packet. For specific details of the CP device provided in the sixth aspect, refer to any one of the second aspect or the optional manners of the second aspect. Details are not described herein again.

According to a seventh aspect, a computer-readable storage medium is provided. The storage medium stores at least one instruction. The instruction is read by a processor, so that a UP device performs the communication method provided in any one of the first aspect or the optional manners of the first aspect.

According to an eighth aspect, a computer-readable storage medium is provided. The storage medium stores at least one instruction. The instruction is read by a processor, so that a CP device performs the communication method provided in any one of the second aspect or the optional manners of the second aspect.

According to a ninth aspect, a computer program product is provided. The computer program product includes computer instructions, and the computer instructions are stored in a computer-readable storage medium. A processor of a UP device reads the computer instructions from the computer-readable storage medium, and the processor executes the computer instructions, so that the UP device performs the communication method provided in any one of the first aspect or the optional manners of the first aspect.

According to a tenth aspect, a computer program product is provided. The computer program product includes computer instructions, and the computer instructions are stored in a computer-readable storage medium. A processor of a CP device reads the computer instructions from the computer-readable storage medium, and the processor executes the computer instructions, so that the CP device performs the communication method provided in any one of the second aspect or the optional manners of the second aspect.

According to an eleventh aspect, a chip is provided. When the chip runs on a UP device, the UP device performs the communication method provided in any one of the first aspect or the optional manners of the first aspect.

According to a twelfth aspect, a chip is provided. When the chip runs on a CP device, the CP device performs the communication method provided in any one of the second aspect or the optional manners of the second aspect.

According to a thirteenth aspect, a network system in which a CP and a UP are separated is provided. The network system includes a UP device and a CP device. The UP device is the UP device provided in any one of the third aspect, the optional manners of the third aspect, or the fifth aspect. The CP device is the CP device provided in any one of the fourth aspect, the optional manners of the fourth aspect, or the sixth aspect.

According to a fourteenth aspect, this application provides a UP device. The UP device includes a main control board and an interface board. Optionally, the UP device further includes a switching board. The main control board includes a first processor and a first memory. The interface board includes a second processor, a second memory, and an interface card. The main control board and the interface board are coupled.

The first memory may be configured to store program code, and the first processor is configured to invoke the program code in the first memory to perform the following operation: generating a first PFCP message based on an interface on the UP device, where the first PFCP message includes information about the interface, and the information about the interface includes an index of the interface.

The second memory may be configured to store program code, and the second processor is configured to invoke the program code in the second memory to trigger the interface card to perform the following operation: sending the first PFCP message to the CP device.

In a possible implementation, an inter-process communication (IPC) channel is established between the main control board and the interface board, and the main control board and the interface board communicate with each other through the IPC channel.

DETAILED DESCRIPTION OF ILLUSTRATIVE EMBODIMENTS

Figure 1:
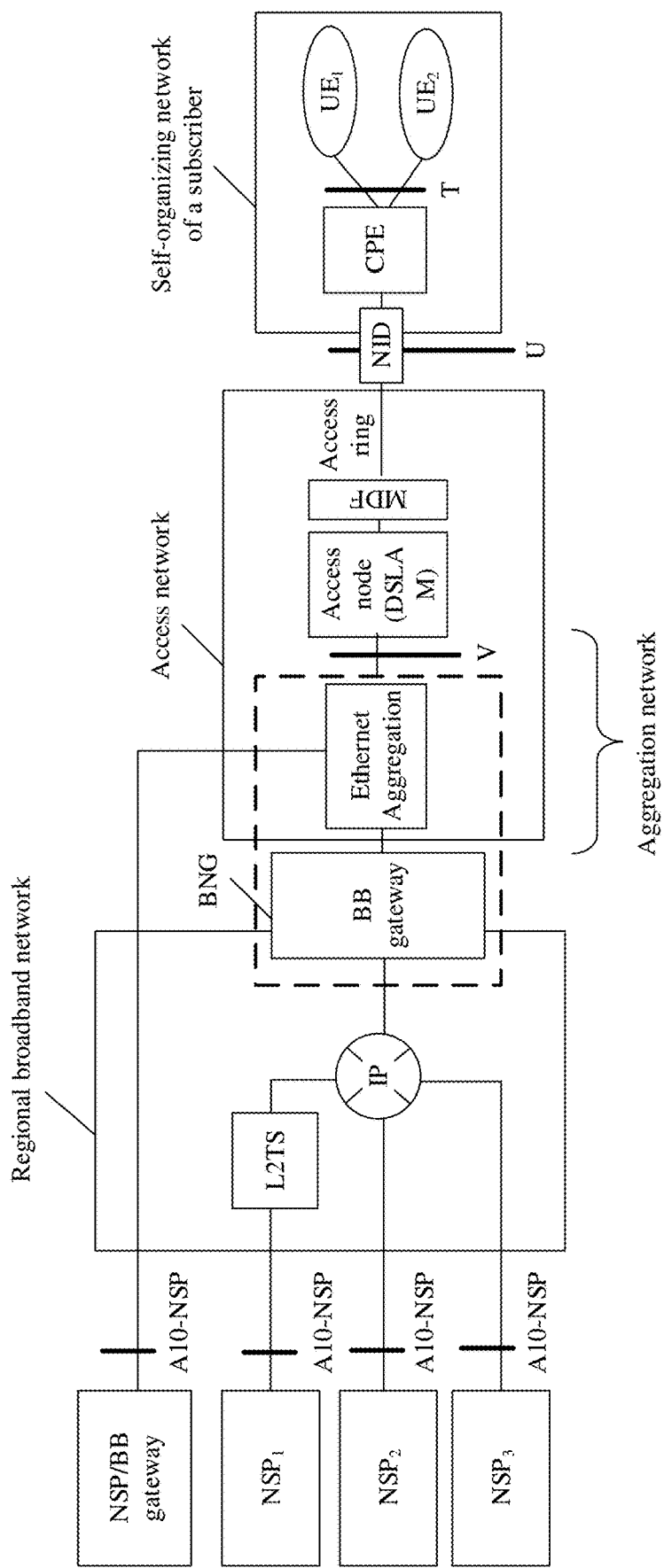
FIG. 1 is a schematic diagram of a position of a BNG in a network according to an embodiment of this application.

To make objectives, technical solutions, and advantages of this application clearer, the following further describes implementations of this application in detail with reference to accompanying drawings.

The term "BNG with CU separation" in embodiments of this application generally refers to a BNG in which a control plane and a forwarding plane are separated. For example, separation of the control plane and the forwarding plane means that the control plane and the forwarding plane are located on different devices, that is, the CP and the UP are two different devices. In another example, separation of the control plane and the forwarding plane means that the control plane and the forwarding plane are located on a same device and functions are separated. Optionally, a device on which the control plane is located and a device on which the forwarding plane is located are distributed at different locations. A quantity relationship between the device on which the control plane is located and the device on which the forwarding plane is located is, for example, a one-to-one relationship or a one-to-many relationship. In other words, one device on which the control plane is located may be configured to control one device on which the forwarding plane is located, or may simultaneously control a plurality of devices on which forwarding planes are located.

In embodiments of this application, "CU separation" may have different names. For example, different standards, different versions of a same standard, different vendors, and different application scenarios may have different names for "CU separation". For example, the term "CU separation" may also be sometimes referred to as "control and forwarding separation", "forwarding-control separation", "control plane and user plane separation", and "control and user separation".

In this embodiment of this application, the "BNG with CU separation" may have different names. For example, different standards, different versions of a same standard, different vendors, and different application scenarios may have different names for "BNG with CU separation". For example, the term "BNG with CU separation" may also be sometimes referred to as "disaggregated BNG (DBNG)". Correspondingly, the CP device in the BNG with CU separation may be referred to as a DBNG-CP device. The UP device in the BNG with CU separation may be referred to as a DBNG-UP device. In another example, the term "BNG with CU separation" may also be sometimes referred to as a "virtual broadband network gateway (Virtual BNG, vBNG) control plane and user plane disaggregated system (CU system)", namely, a "vBNG CU system". Correspondingly, the CP device in the BNG with CU separation may be referred to as a vBNG-CP device, and the UP device in the BNG with CU separation may be referred to as a vBNG-UP device. For another example, the term "BNG with CU separation" may also be sometimes referred to as a "virtual broadband remote access server (vBRAS) CU system", namely, a "vBRAS CU system". Correspondingly, the CP device in the BNG with CU separation may be referred to as a vBRAS-CP device. The UP device in the BNG with CU separation may be referred to as a vBRAS-UP device. In this specification, the "DBNG", the "vBNG CU system", and the "vBRAS CU system" are used interchangeably.

In embodiments of this application, the "CP device" may have different names. For example, different standards, different versions of a same standard, different vendors, and different application scenarios may have different names for the "CP device". For example, the term "CP device" may also be sometimes referred to as a "CP Function (CPF)" or a "CP plane". In this specification, the "CP device", the "CPF", and the "CP plane" are used interchangeably. The term "CP device" refers to any device that implements CP functions.

In embodiments of this application, the "UP device" may have different names. For example, different standards, different versions of a same standard, different vendors, and different application scenarios may have different names for the "UP device". For example, the term "UP device" may also be sometimes referred to as a "UP function (UP function, UPF)" or a "UP plane". In this specification, the "UP device", the "UPF", and the "UP plane" are used interchangeably. The term "UP device" refers to any device that implements UP functions.

The terminal in embodiments of this application is, for example, user equipment (UE), an access terminal, a subscriber unit, a subscriber station, a mobile station, a mobile console, a remote station, a remote terminal, a mobile device, a user terminal, a terminal device, a wireless communication device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network PLMN), or the like. This is not limited in embodiments of this application.

The following describes the BNG.

The BNG is responsible for connecting user equipment to a broadband network, and is a key device in the network. FIG. 1 is an example for describing a position of a BNG in a network. A BB gateway Network Gateway in FIG. 1 is an example of a BNG.

Figure 2:
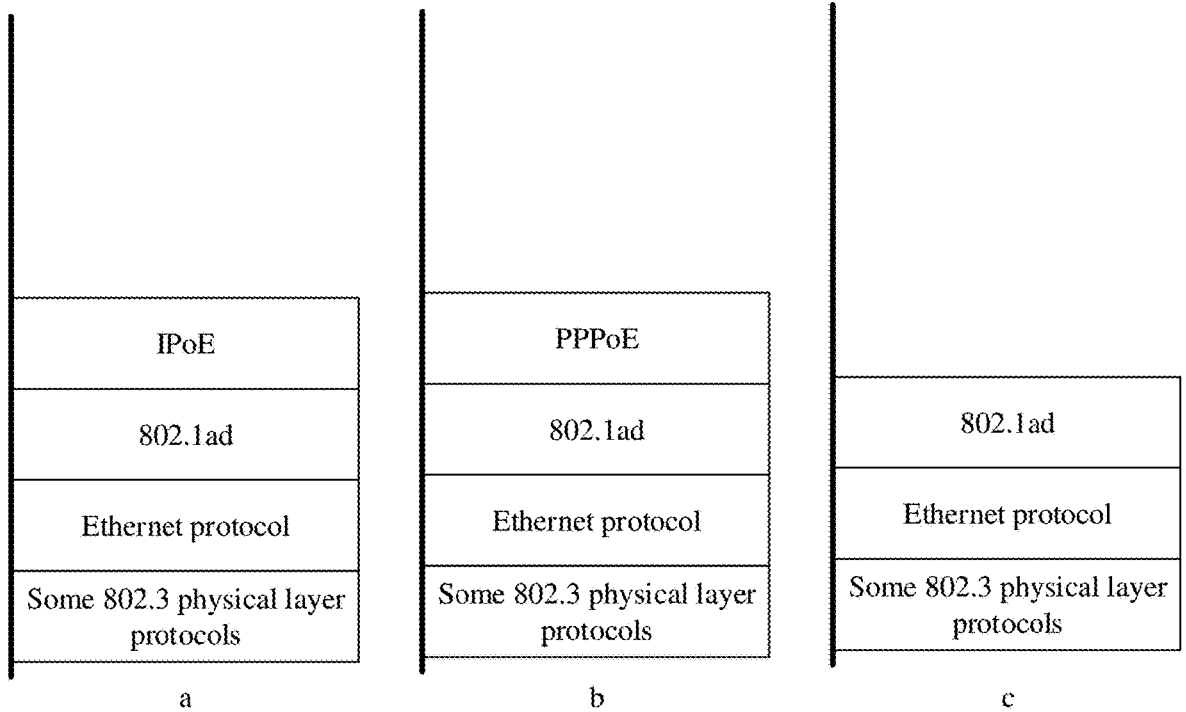
FIG. 2 is a schematic diagram of a protocol stack processed by a BNG according to an embodiment of this application.

A protocol stack processed by the BNG includes but is not limited to the Internet Protocol over Ethernet (IPoE), the Point-to-Point Protocol over Ethernet (PPPoE), the 802.1ad protocol, the Ethernet protocol, and some 802.3 PHY (some 802.3 Phy) protocols. For example, FIG. 2 is an example of an access-side protocol stack processed by a BNG. a, b, and c in FIG. 2 represent three parallel forms. In other words, the BNG may encapsulate a packet in a form corresponding to a protocol stack shown in any one of a, b, and c.

Figure 3:
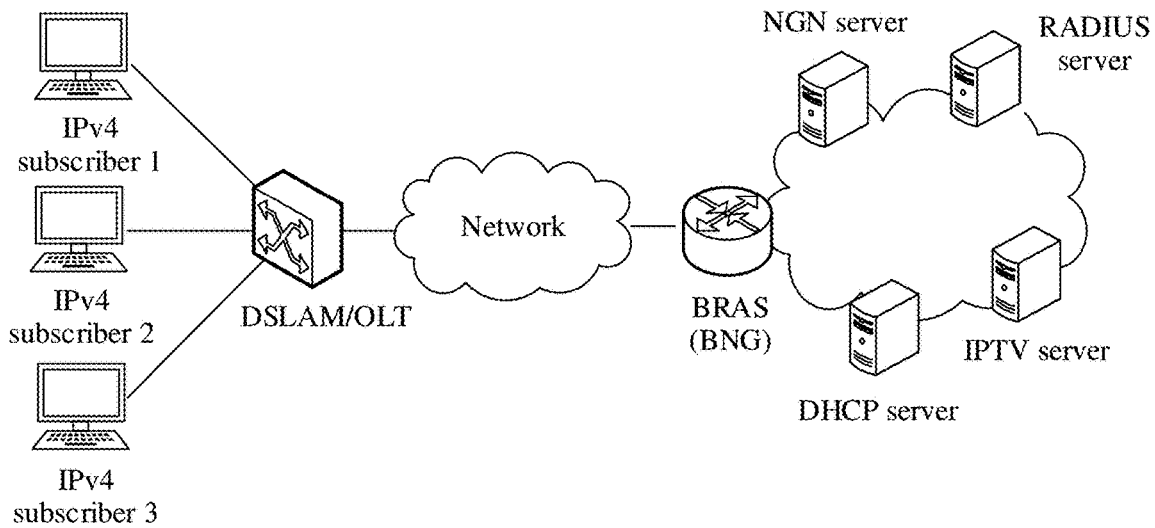
FIG. 3 is a diagram of an architecture of a system including a BNG according to an embodiment of this application.

The BNG is mainly responsible for authentication and Internet Protocol (IP) address allocation. Authentication is implemented based on RADIUS. Specifically, the BNG serves as a RADIUS client, and interacts with a RADIUS server to complete authentication of a terminal. A BRAS in FIG. 3 is an example of a BNG. Functions of the BRAS are basically the same as those of the BNG. In FIG. 3, a terminal of an Internet Protocol version 4 (IPv4) subscriber 1, a terminal of an IPv4 subscriber 2, and a terminal of an IPv4 subscriber 3 are in network connection with a digital subscriber line access multiplexer (Digital Subscriber Line Access Multiplexer, DSLAM) or an optical line terminal (OLT). The DSLAM/OLT is connected to the BRAS. The BRAS is connected to an NGN server, a RADIUS server, a DHCP server, and an interactive personality TV (IPTV) server. The BRAS is configured to allocate IP addresses to the terminal of the IPv4 subscriber 1, the terminal of the IPv4 subscriber 2, and the terminal of the IPv4 subscriber 3, and perform authentication on the terminal of the IPv4 subscriber 1, the terminal of the IPv4 subscriber 2, and the terminal of IPv4 subscriber 3 separately.

Figure 4:
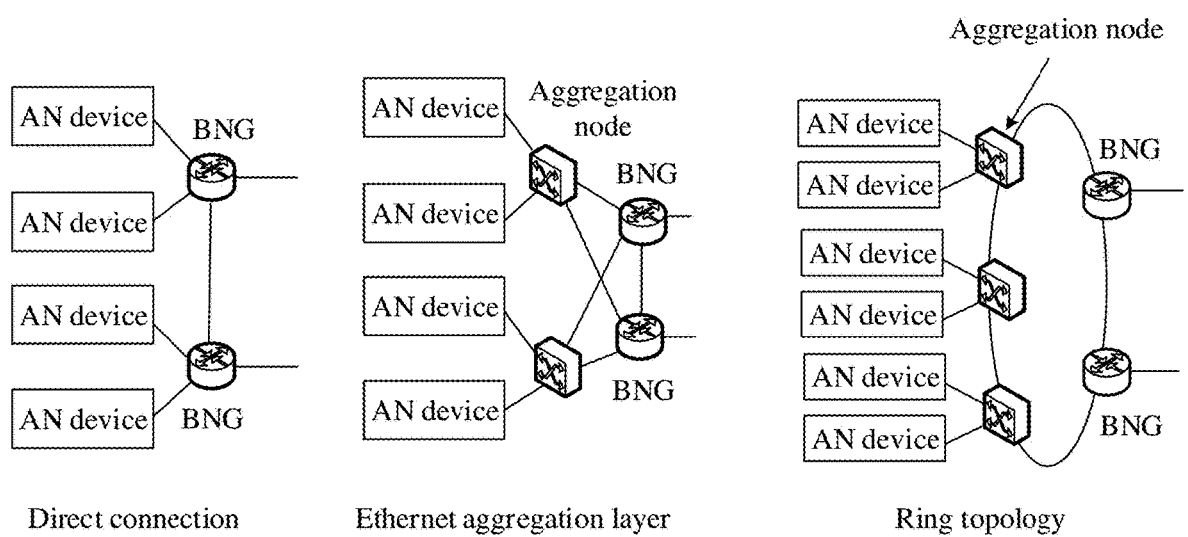
FIG. 4 is a schematic diagram depicting that an AN device accesses a BNG according to an embodiment of this application.

The BNG includes a plurality of physical ports, and different physical ports may access different access node (AN) devices. A manner in which an AN device accesses the BNG includes but is not limited to a manner in which the AN device is directly connected to the BNG, and a manner in which the AN device is connected to the BNG via an aggregation device. FIG. 4 is an example in which a BNG provides a plurality of physical ports for access of different AN devices. A terminal is identified with a unique virtual local area network (Virtual LAN, VLAN) tag (VLAN Tag), and the terminal accesses the terminal via a fixed physical port of the BNG. Information about the physical port and the VLAN tag used by the terminal to access the BNG is equivalent to a location of the terminal.

Figure 5:
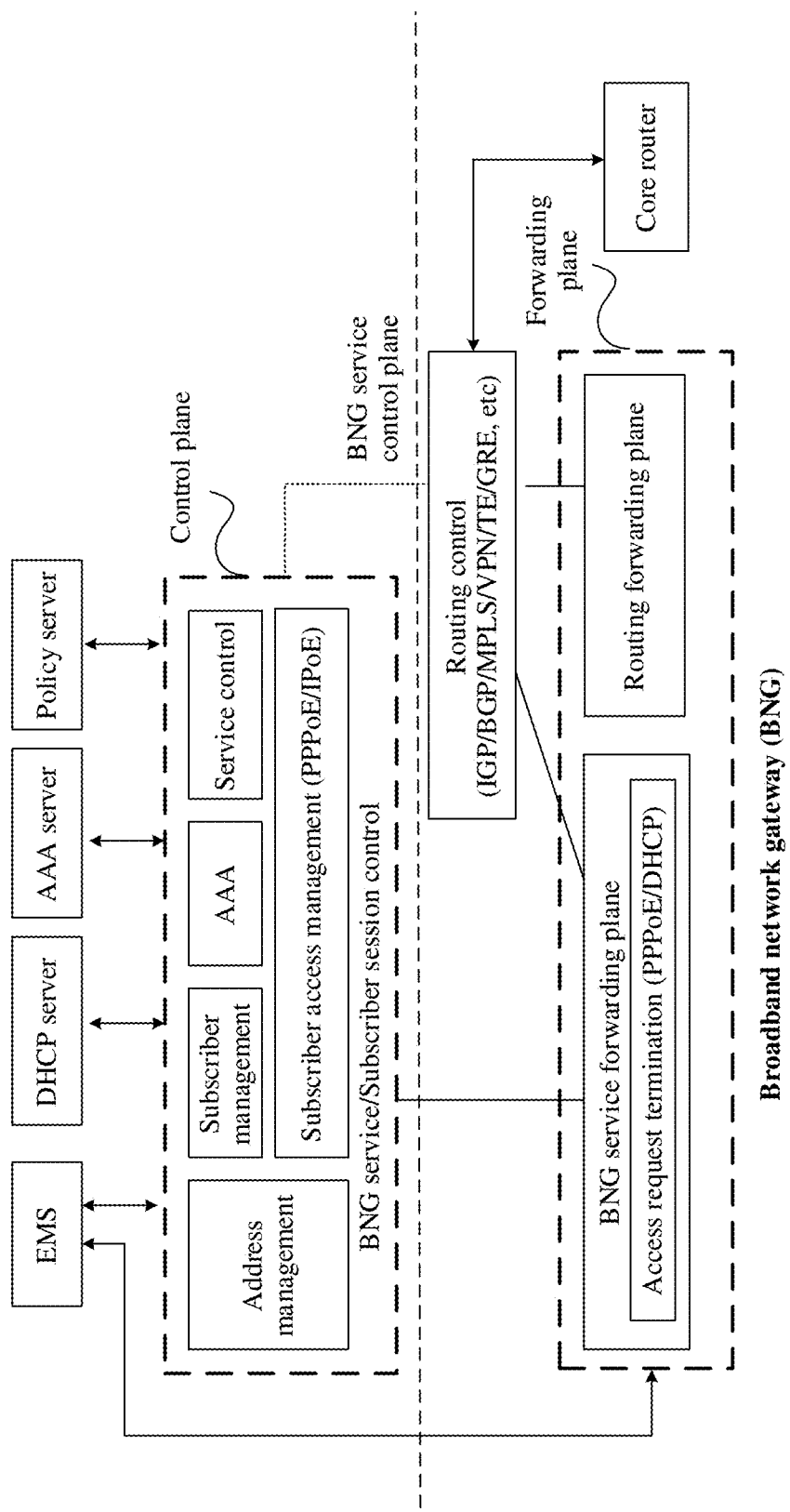
FIG. 5 is a diagram of an architecture of function modules in a BNG according to an embodiment of this application.

FIG. 5 is an example of internal function modules in the BNG. An upper dashed box in FIG. 5 is a control plane of the BNG. The control plane of the BNG provides functions such as access management, session management, address allocation, service policy control, or authentication, authorization, accounting (AAA). A lower dashed box in FIG. 5 is a forwarding plane of the BNG. The forwarding plane of the BNG is configured to perform processing for forwarding a packet of a terminal, including: sending an access protocol packet to the control plane, forwarding a control packet sent from the control plane to the terminal, performing a binding check on an uplink data packet of the terminal (after authentication passes, a corresponding binding table is generated on the forwarding plane) and IP forwarding, quality of service (QoS) processing and statistics, and the like.

Figure 6:
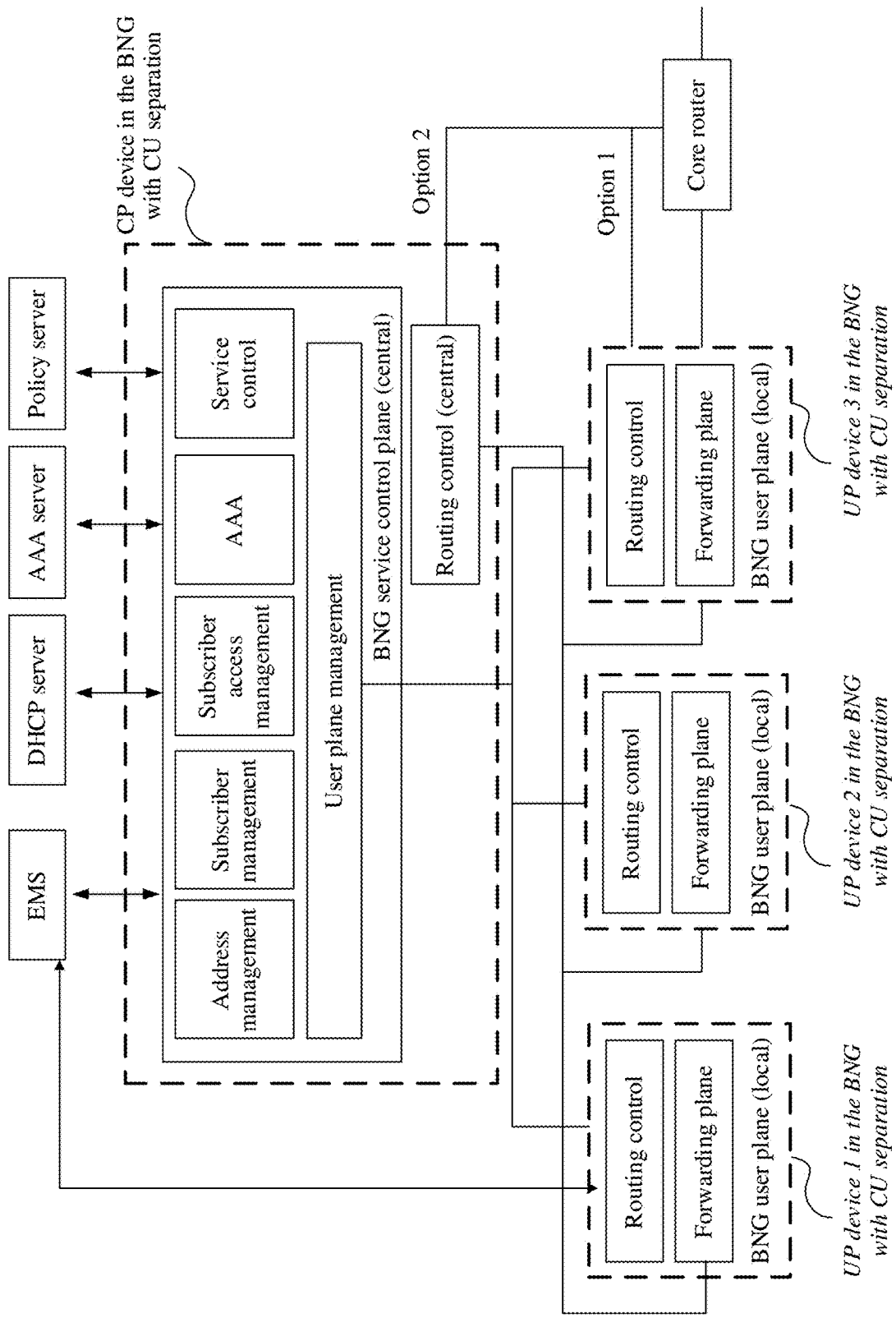
FIG. 6 is a diagram of an architecture of function modules in a BNG with CU separation according to an embodiment of this application.

In 2019, the Broadband Forum (BBF) implements defining of architectures and protocols of a virtual broadband gateway control device (vBNG) CU system. FIG. 6 is a BNG with a CU separation architecture defined in BBF TR-384. In the BNG with the CU separation architecture, a control plane is disaggregated from a physical BNG and deployed on a data center. The physical BNG retains a forwarding plane function and is still deployed at the original position. Optionally, the BNG with CU separation includes a plurality of UP devices. For example, the BNG with CU separation shown in FIG. 6 includes three UP devices: a UP device 1, a UP device 2, and a UP device 3. Optionally, a plurality of UP devices in the BNG of the CU separation architecture are distributed at different locations. Optionally, a plurality of UP devices in the BNG of the CU separation architecture coordinately share forwarding tasks based on a distributed architecture.

Figure 7:
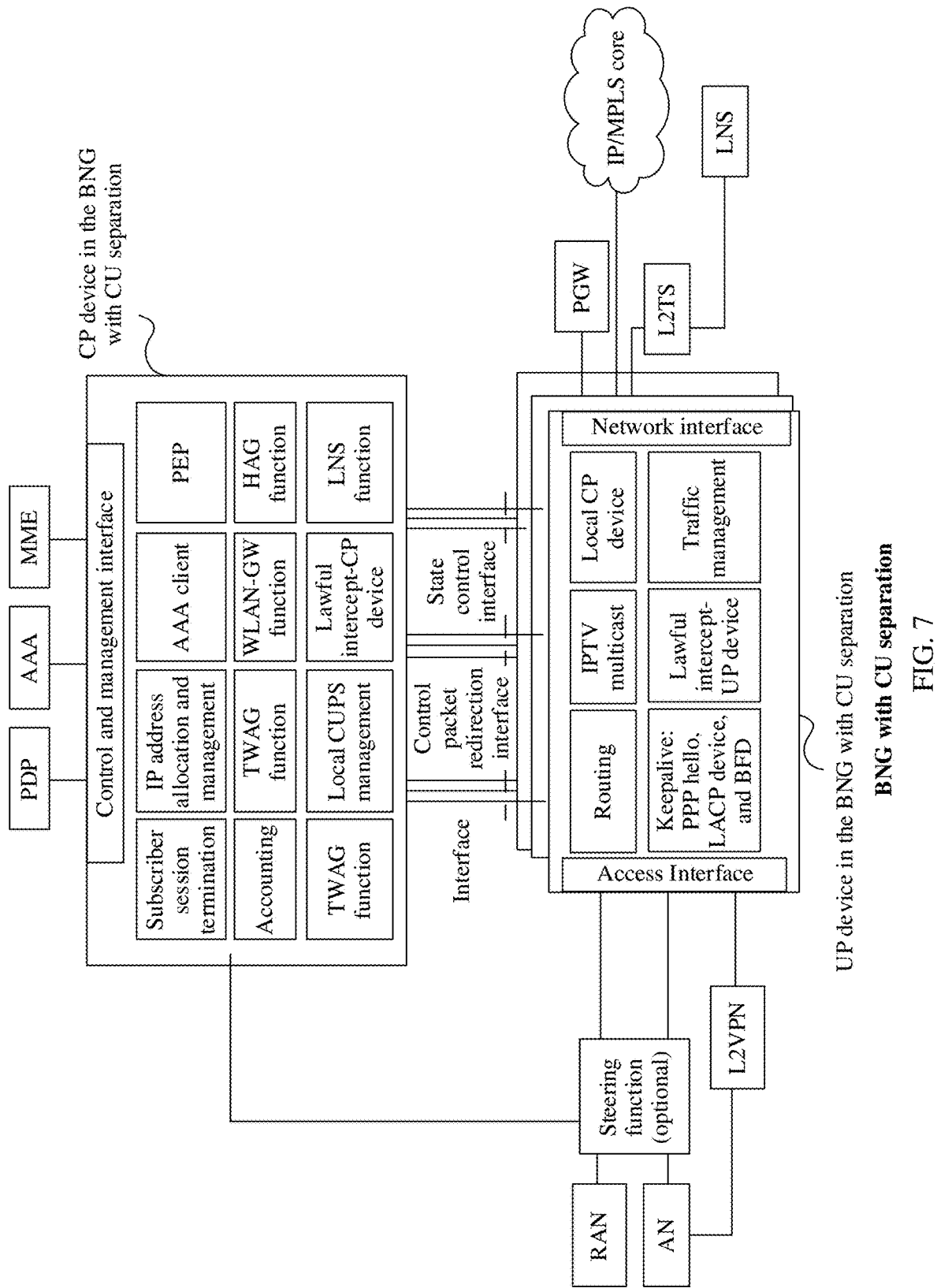
FIG. 7 is a diagram of an architecture of function modules in a BNG with CU separation according to an embodiment of this application.

FIG. 7 shows three types of interfaces between a control plane (CP, also referred to as a control plane) and a user plane (UP, also referred to as a forwarding plane) in a vBNG CU system defined in BBF TR-459. The three types of interfaces between the CP device and the UP device include a management interface (Mi), a control packet redirection interface (CPRi), and a state control interface (SCi).

Communication of the management interface is implemented over the XML-based Network Configuration Protocol (Netconf)/yang (a data modeling language) protocol.

Figure 8:
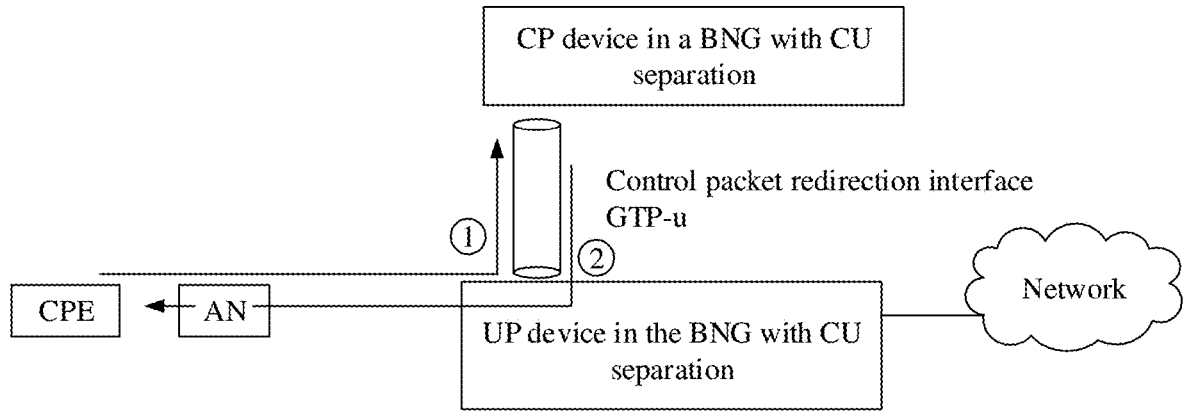
FIG. 8 is a schematic diagram of a control packet redirection interface according to an embodiment of this application.

The control packet redirection interface is configured to complete forwarding of a protocol packet between customer premise equipment (CPE) and a CP device. The control packet redirection interface uses the General Packet Radio Service (GPRS) tunneling protocol user plane (GPRS tunneling protocol (GTP) user plane, GTP-u) tunnel. FIG. 8 is an example of a function of the control packet redirection interface.

Figure 9:
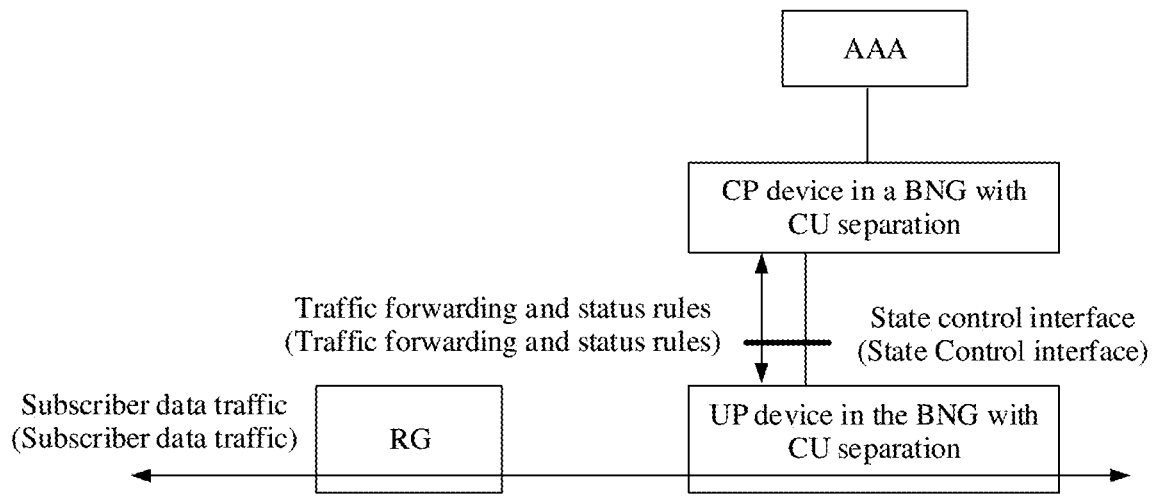
FIG. 9 is a schematic diagram of a state control interface according to an embodiment of this application.

Communication of the state control interface is implemented using the PFCP defined in 3rd Generation Partnership Project (3GPP) TS 29.244. The state control interface is mainly used to implement functions using which a UP device to report node information to a CP device, a CP device delivers a forwarding control action to a UP device for execution after the CP device completes terminal access, and the UP device collects statistics and reports to the CP device. FIG. 9 is an example of a function of the state control interface.

The TR-459 specification merely describes "the management interface includes the following functions: exchanging information about a DBNG-UP resource, where the resource includes a card, a port and/or an interface", but does not provide an implementation of how a CP device learns of an access port (also referred to as an interface, an access interface) of a terminal. Therefore, an implementation of reporting interface information of the UP device to the CP device is needed, to deploy a BNG with CU separation.

In view of this, the PFCP is expanded in this embodiment, so that an interface on the UP device is reported to the CP device. The state control interface between the CP device and the UP device is expanded by using the PFCP, and specific content of access interface information carried on the CPRi interface (GTP-u) is defined.

Embodiments of this application relate to application of the PFCP. For ease of understanding, the following first describes related concepts of terms in the PFCP in embodiments of this application.

(1) PFCP

Figure 10:
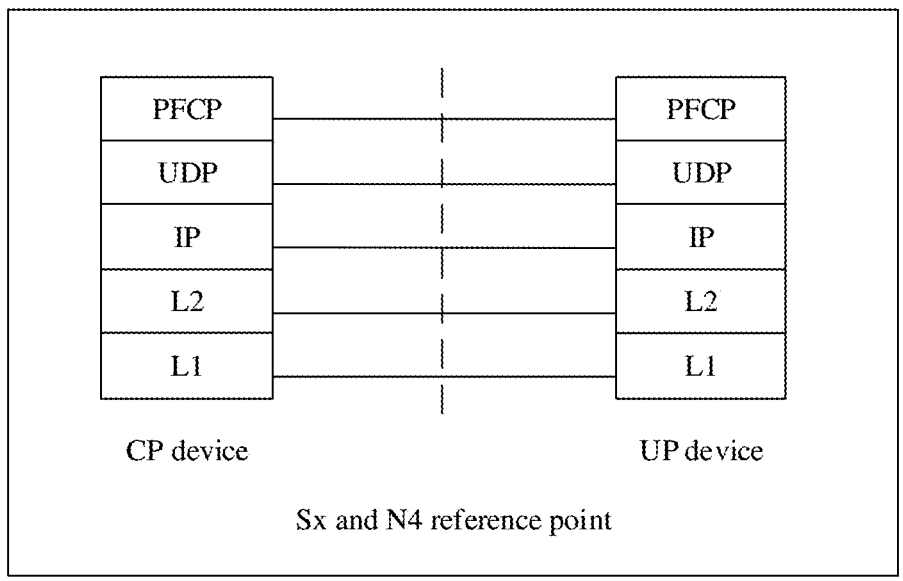
FIG. 10 is a schematic diagram of a position of PFCP in a protocol stack according to an embodiment of this application.

FIG. 10 is an example of a position of the PFCP in a protocol stack. The PFCP is carried over the User Datagram Protocol (UDP), and an IP layer of the PFCP may be IPv4 or IPv6. In the PFCP, a UP device is called a UPF, and a CP device is called a CPF.

(2) UDP Port Number in a PFCP Message

In a request message of the PFCP, a UDP destination port number is 8805, and a UDP source port number is allocated by a sender of the PFCP message. In a response message of the PFCP, a UDP destination port number is the source port number in the request message. A UDP source port number in the response message of the PFCP is the destination port number in the corresponding request message.

(3) PFCP Association

Figure 11:
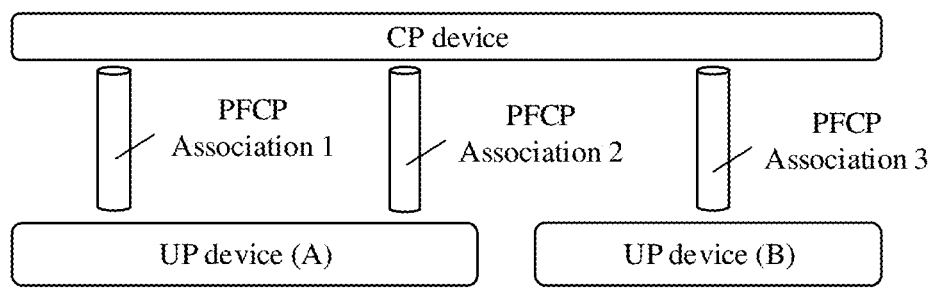
FIG. 11 is a schematic diagram of establishing a plurality of PFCP associations between a CP device and a UP device according to an embodiment of this application.

When a connection (which is expressed by a pair of a destination IP address and a source IP address) is established between a CP device and a UP device, the connection is called a PFCP association (the UP device and the CP device are distinguished by using nodes). Theoretically, a plurality of PFCP associations may be established between a pair of a CP device and a UP device, and control information carried by each of the PFCP associations is independent of each other. FIG. 11 is an example of establishing a plurality of PFCP associations between a CP device and UP devices. In FIG. 11, the CP device and two UP devices establish three PFCP associations in total. The CP device and a UP device (A) establish two PFCP associations: a PFCP association 1 and a PFCP association 2. The CP device and a UP device (B) establish PFCP association 3.

(4) PFCP Session

Figure 12:
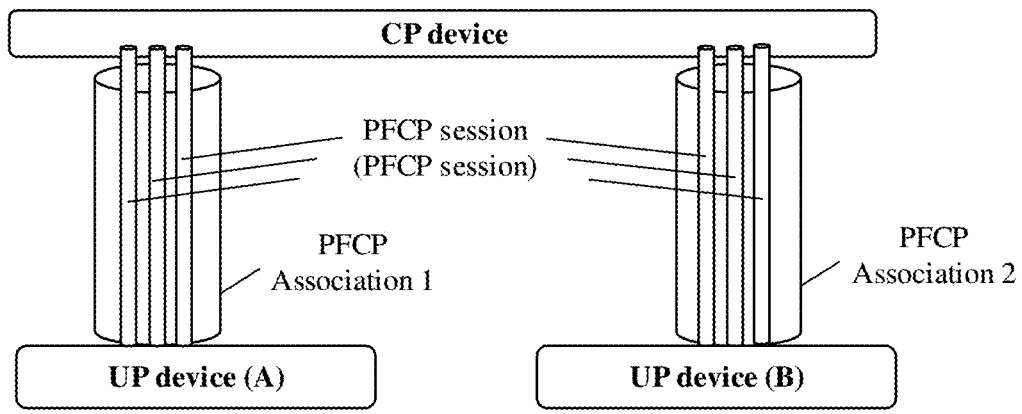
FIG. 12 is a schematic diagram of PFCP associations and PFCP sessions according to an embodiment of this application.

After terminals go online, a CP device delivers control data to a UP device. Information about each terminal is called a PFCP session. Refer to FIG. 12. Each PFCP association corresponds to control information of a part of PFCP sessions. In FIG. 12, each PFCP association corresponds to control information of a part of sub-sessions. In this case, for sending of a response message of a PFCP session, an IP header of a corresponding request message of the PFCP session needs to be found, and a destination IP and a source IP are exchanged, so that an IP header of the response message is encapsulated. Data is encoded as network byte order.

(5) PFCP Message

Table 1 is an example of a PFCP message format. A PFCP message includes two parts: a PFCP message header and an IE. One PFCP message includes at least one PFCP message header, and optionally further includes an IE. There may be one or more IEs in one PFCP message.

TABLE 1

| Octets | Bits | | | | | | | |
|---|---|---|---|---|---|---|---|---|
| | 8 | 7 | 6 | 5 | 4 | 3 | 2 | 1 |
| 1 to m | PFCP message header | | | | | | | |
| m + 1 to n | Zero or more information element(s) | | | | | | | |

Table 2 is an example in which one UDP packet carries a plurality of PFCP messages. An FO (Follow ON) in each of preceding PFCP message headers in the UDP packet is identified to be 1. An FO in the last PFCP message header is identified to be 0.

TABLE 2

| Octets | Bits | | | | | | | |
|---|---|---|---|---|---|---|---|---|
| | 8 | 7 | 6 | 5 | 4 | 3 | 2 | 1 |
| 1 to m | PFCP message 1 header | | | | | | | |
| m + 1 to n | Zero or more information element(s) | | | | | | | |
| n + 1 to p | PFCP message 2 header | | | | | | | |
| p + 1 to q | Zero or more information element(s) | | | | | | | |
| . . . | . . . | | | | | | | |
| . . . | . . . | | | | | | | |
| r to s | PFCP message N header | | | | | | | |
| s + 1 to u | Zero or more information element(s) | | | | | | | |

(6) PFCP Message Header

Table 3 is an example of a general format of a PFCP message header. The message header is a variable-length structure. The first four bytes are in a fixed format. A flag field indicates whether extra information is carried. As shown in Table 3, the message header needs to be in a format of 4-byte alignment, and members are encoded as network byte order.

TABLE 3

| Octets | Bits | | | | | | | |
|---|---|---|---|---|---|---|---|---|
| | 8 | 7 | 6 | 5 | 4 | 3 | 2 | 1 |
| 1 | Version | | Spare | Spare | FO | MP | S | |
| 2 | Message type | | | | | | | |
| 3 | Message length (1$^{st}$ Octet) | | | | | | | |
| 4 | Message length (2$^{nd}$ Octet) | | | | | | | |
| m to k (m + 7) | If S flag is set to "1", then SEID shall be placed into octets 5 to 12. Otherwise, SEID field is not present at all. | | | | | | | |
| n to (n + 2) | Sequence number | | | | | | | |
| (n + 3) | Spare | | | | | | | |

Table 4 is an example of a meaning of each field in a PFCP message header.

TABLE 4

| S flag | When a value of S flag is 1, it indicates that the packet includes an SEID field. |
|---|---|
| SEID | SEID is short for Session Endpoint Identifier, which is a unique identifier of a PFCP session or a subscriber-session. A length of the SEID is 8 bytes. The SEID uniquely identifies information about a session under control of the SEID. |
| MP flag | Message priority, the priority of the message If this flag is 1, the priority is stored from bits 5 to 8 in byte 16. When a system is overloaded, this parameter can be carried in a message. A receiver preferentially processes a high-priority message and discards a low-priority message. |
| FO flag | Follow On. If a packet carries a plurality of messages, the FO of the last message header is 0, and the FO of the preceding message headers is 1. |
| Sequence number | Sequence number. The sequence number includes three bytes. If S flag is 0, a beginning of a value of the SN moves forward to the fifth byte. |
| Version | Version number. The version includes 3 bits. The current version number is 1, and is 001B in binary format. |
| Spare | A reserved field to fill the four bytes. The spare field is required to be set to 0. |
| Message type | Message type |
| Message length | Message length. In decimal format. The message length does not include the fixed 4-byte part of the header. The length includes the following SEID, SN, and IEs. |

In the PFCP header, what is padded in the fifth byte and the following bytes is related to a sequence of the flags in the first byte. With a sequence from bit 1 to bit 8 of the first byte in the PFCP header, when a bit is 1, padding is performed on a byte corresponding to the bit. Table 5 is an example of a message header format of a PFCP node related message (Node message).

TABLE 5

| Octets | Bits | | | | | | | |
|---|---|---|---|---|---|---|---|---|
| | 8 | 7 | 6 | 5 | 4 | 3 | 2 | 1 |
| 1 | Version | | Spare | Spare | FO = o | MP = o | S = o | |
| 2 | Message type | | | | | | | |
| 3 | Message length (1$^{st}$ Octet) | | | | | | | |
| 4 | Message length (2$^{nd}$ Octet) | | | | | | | |
| 5 | Sequence Number (1$^{st}$ Octet) | | | | | | | |
| 6 | Sequence Number (2$^{nd}$ Octet) | | | | | | | |
| 7 | Sequence Number (3$^{rd}$ Octet) | | | | | | | |
| 8 | Spare | | | | | | | |

Table 6 is an example of a format of a PFCP session message header. Flag S=1. A SEID starts from the fifth byte. The SEID in the message header is a remote peer's SEID, that is, the SEID indicates a SEID of a receiver.

TABLE 6

| Octets | Bits | | | | | | | |
|---|---|---|---|---|---|---|---|---|
| | 8 | 7 | 6 | 5 | 4 | 3 | 2 | 1 |
| 1 | Version | | Spare | Spare | FO | MP | S = 1 | |
| 2 | Message type | | | | | | | |
| 3 | Message length (1$^{st}$ Octet) | | | | | | | |
| 4 | Message length (2$^{nd}$ Octet) | | | | | | | |
| 5 | Session Endpoint Identifier (1$^{st}$ Octet) | | | | | | | |
| 6 | Session Endpoint Identifier (2$^{nd}$ Octet) | | | | | | | |
| 7 | Session Endpoint Identifier (3$^{rd}$ Octet) | | | | | | | |
| 8 | Session Endpoint Identifier (4$^{th}$ Octet) | | | | | | | |
| 9 | Session Endpoint Identifier (5$^{th}$ Octet) | | | | | | | |
| 10 | Session Endpoint Identifier (6$^{th}$ Octet) | | | | | | | |
| 11 | Session Endpoint Identifier (7$^{th}$ Octet) | | | | | | | |
| 12 | Session Endpoint Identifier (8$^{th}$ Octet) | | | | | | | |
| 13 | Sequence number (1$^{st}$ Octet) | | | | | | | |
| 14 | Sequence number (2$^{nd}$ Octet) | | | | | | | |
| 15 | Sequence number (3$^{rd}$ Octet) | | | | | | | |
| 16 | Message priority | | | | Spare | | | |

(7) IE in the PFCP Message

An IE is a service attribute defined in the PFCP protocol. An IE uses an encapsulation format of TLV. There may be a nested relationship between different IEs. Whether an IE is mandatory is specified based on different contexts. For example, classification of IEs is shown in the following Table 7.

TABLE 7

| Classification of whether an IE appears in this service process | Description |
|---|---|
| Mandatory (M) | Mandatory |
| Conditional (C) | The IE needs to be carried if a specific condition is met. |
| Conditional-Optional (CO) | The IE may be carried if a specific condition is met. |
| Optional (O) | Whether the IE is carried is optional. |

Based on different nesting manners, IEs are classified into grouped IEs (grouped IEs) and embedded IEs (embedded IEs). The embedded IE is an attribute of a smallest unit. One grouped IE may contain a plurality of embedded IEs. Refer to Table 8 and Table 9. Table 8 shows a format of an IE, and Table 9 shows a meaning of each field in the IE.

TABLE 8

| Octets | Bits |
|---|---|
| | 8 7 6 5 4 3 2 1 |
| 1 to 2 | Type = xxx (decimal) |
| 3 to 4 | Length = n |
| p to (p + 1) | Enterprise ID |
| k to (n + 4) | IE specific data or content of a grouped IE |

TABLE 9

| | |
|---|---|
| Type | Type of the IE. 2 bytes. A value of 0 to 32767 indicates an IE of the 3GPP standard. A value of 32768 to 65535 indicates a vendor-defined IE. |
| Length | Length. 2 bytes. In decimal format. The length does not include the four bytes of the type field and the length field. |
| Enterprise ID | For a 3GPP IE, there is no enterprise ID. For a vendor-defined IE, the field is a vendor code. Enterprise code: IANA-assigned "SMI Network Management Private Enterprise Codes". The Enterprise ID is an optional field. |
| Data or sub-IE | A data part or a sub-IE. |

Message types are defined in Table 10 below.

TABLE 10

| Value of a message type (decimal) | Message |
|---|---|
| 0 | Reserved PFCP Node related messages |
| 1 | PFCP heartbeat request Heartbeat request |
| 2 | PFCP heartbeat response heartbeat response |
| 3 | PFCP PFD management request |
| 4 | PFCP PFD management response |
| 5 | PFCP association setup request Association setup request (negotiation capability) |
| 6 | PFCP association setup response Association setup response |
| 7 | PFCP association update request Association update request (Capability change) |
| 8 | PFCP association update response Association update response |
| 9 | PFCP association release request Association release request |
| 10 | PFCP association release response Association update response |
| 11 | PFCP version not supported response This message is returned when an unsupported PFCP version is received. An SN in the message header is randomly set to a value, which is to be ignored by a receiver. This message only includes a header part, but not a payload part. |
| 12 | PFCP node report request Node-level report request |
| 13 | PFCP node report response Node-level report response |
| 14 | PFCP session set deletion request Request for deleting a session set |
| 15 | PFCP session set deletion response Response for deleting a session set |
| 16 to 49 | For future use PFCP Session related messages |
| 50 | PFCP session establishment request Session establishment request |
| 51 | PFCP session establishment response |

TABLE 10-continued

| Value of a message type (decimal) | Message |
|---|---|
| | Response for establishing a session |
| 52 | PFCP session modification request Request for modifying a session |
| 53 | PFCP session modification response Response for modifying a session |
| 54 | PFCP session deletion request Request for deleting a session |
| 55 | PFCP session deletion response Response for deleting a session |
| 56 | PFCP session report request Session-level report request |
| 57 | PFCP session report response Session-level report response |
| 58 to 99 | For future use Other messages |
| 100 to 255 | For future use |

In the PFCP, a plurality of PFCP messages may be bundled (PFCP messages bundling). Specifically, one UDP packet may carry a plurality of PFCP messages, and an SN of each message header is independent. If such bundled messages are discarded during transmission, and need to be retransmitted, a sequence for retransmission does necessarily need to be a previous bundling sequence.

(8) PFCP Forwarding Model

Figure 13:
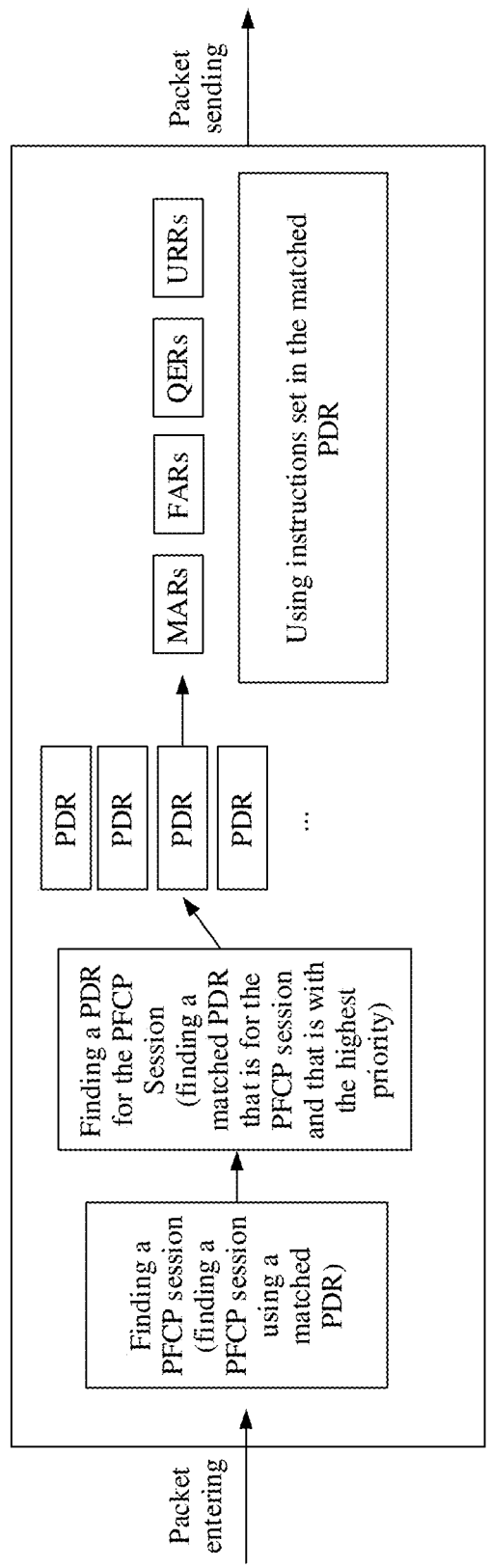
FIG. 13 is a schematic diagram of a packet processing procedure of a UP device according to an embodiment of this application.
Figure 14:
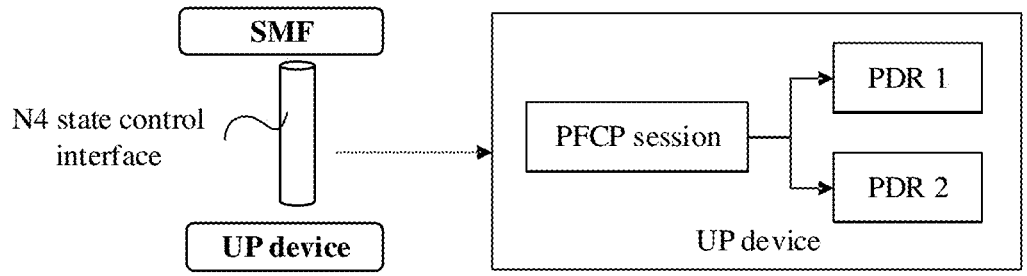
FIG. 14 is a schematic diagram of a PFCP session according to an embodiment of this application.

Based on the 5th generation mobile communication technology (5th generation mobile networks or 5th generation wireless systems, 5th-Generation, 5G) service, the PFCP defines an abstract UP device model. Based on this model, node related messages, session messages, and a series of IEs between the control plane and the user plane are defined. For example, FIG. 13 is an example of a packet processing process of a UP device. The packet processing process of the UP device is forwarding the packet in a flow matching manner, which is similar to a principle of access control lists (ACL). Refer to FIG. 13. After entering a system, the packet performs matching with a rule table of a packet detection rule (PDR), and after the packet matches the rule table, a fixed action is performed. The packet processing process of the UP device includes two concepts: a PFCP session and a PDR. FIG. 14 is an example of a PFCP session. An SMF delivers a flow processing policy (Packet Detection Rule, PDR, also referred to as a packet detection rule) by using a PFCP session over an $N_4$ interface. The UP device performs a PDR to process packets.

Figure 15:
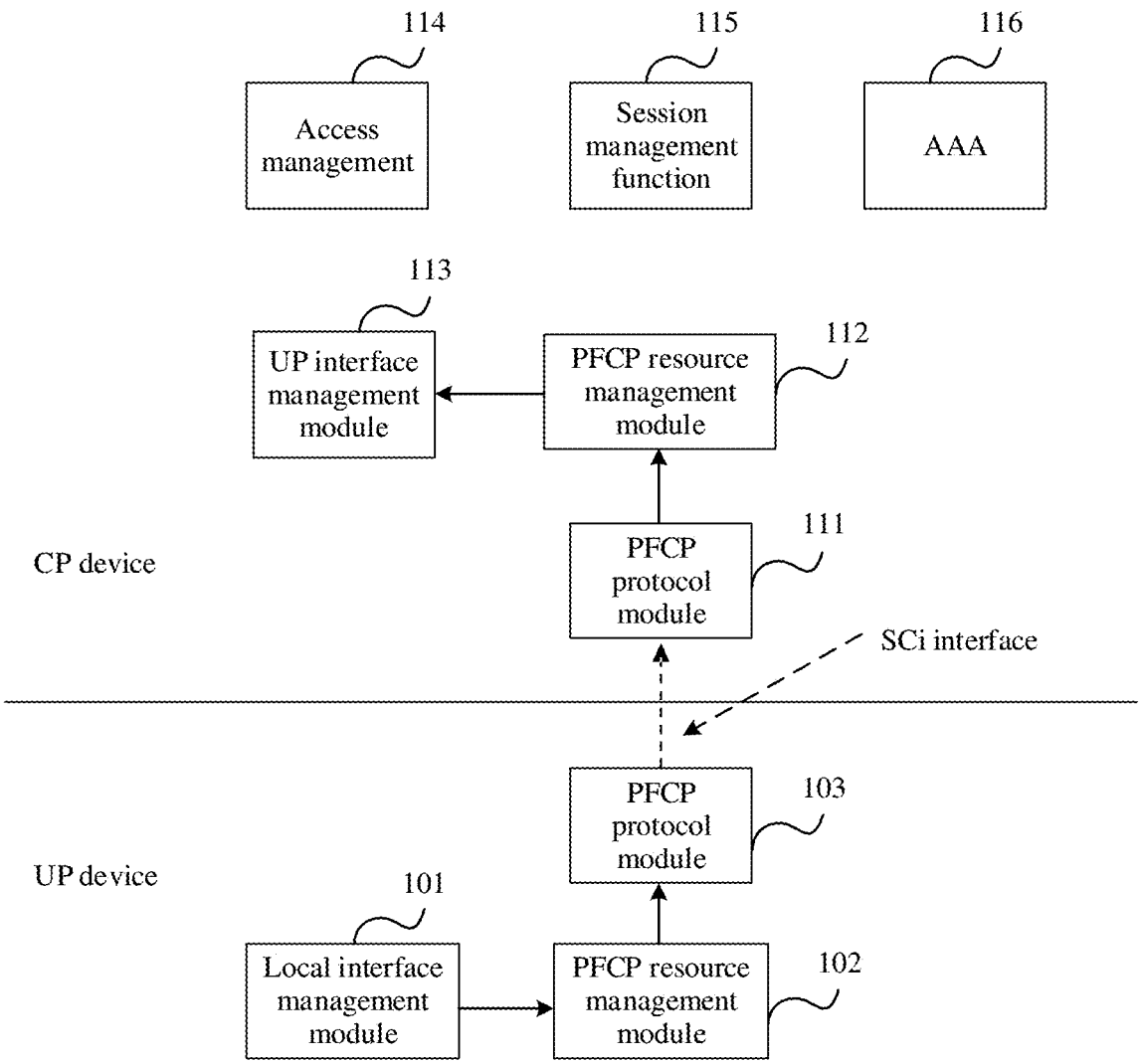
FIG. 15 is a diagram of an architecture of functional modules of a UP device and a CP device according to an embodiment of this application.

With reference to FIG. 15, the following describes a logical function architecture of a BNG with CU separation provided in this embodiment.

Refer to FIG. 15. The UP device includes a local interface management module 101, a PFCP resource management module 102, and a PFCP protocol module 103.

The local interface management module 101 is configured to manage an interface on the UP device, and is further configured to record at least one of a link parameter, a state, and a configured MTU of the interface on the UP device. When interface information of the UP device changes, the local interface management module 101 notifies the PFCP resource management module 102 that the interface information changes.

The PFCP resource management module 102 is configured to: when sensing that the interface information changes, trigger the PFCP protocol module 103 to report the change to the CP device.

The PFCP protocol module 103 is configured to encapsulate data requested by the PFCP resource management module 102 into a PFCP message (for example, a PFCP UP resource report request or a PFCP node report request message), and send the PFCP message to the CP device.

The CP device includes a PFCP protocol module 111, a PFCP resource management module 112, a UP interface management module 113, an access management module 114, a session management module 115, and an AAA module 116.

The PFCP protocol module 111 is configured to receive a PFCP message reported by the UP device, and send the PFCP message to the PFCP resource management module 112.

The PFCP resource management module 112 is configured to receive a PFCP message from the PFCP protocol module 111, parse the PFCP message to obtain interface information carried in the PFCP message, and send the interface information to the UP interface management module.

The UP interface management module is configured to record interface information of the UP device into a memory of the CP device. If it is determined, based on the interface information of the UP device, that an interface state of the UP device changes, the UP interface management module 113 indicates the session management module 115 to perform processing.

The access management module 114 is configured to process subscriber access. The access management module 114 obtains an MTU and interface location information of the interface on the UP device from the UP interface management module, and sends a packet to the terminal via a CPRi interface based on the MTU and the interface location information of the interface.

The session management module 115 is configured to obtain interface location information from the UP interface management module, construct a network access server (NAS) port (NAS-Port) required for RADIUS authentication based on the interface location information, and construct a dynamic host configuration protocol (DHCP) option 82 based on the interface location information. The session management module 115 is further configured to trigger a session protection processing procedure when sensing that an access side interface is down (down).

The foregoing describes the logical function architecture of the BNG with CU separation. The following describes, by using a method 200 and a method 300 and based on the architecture provided above, an example of a method procedure in which a UP device reports interface information.

Figure 16:
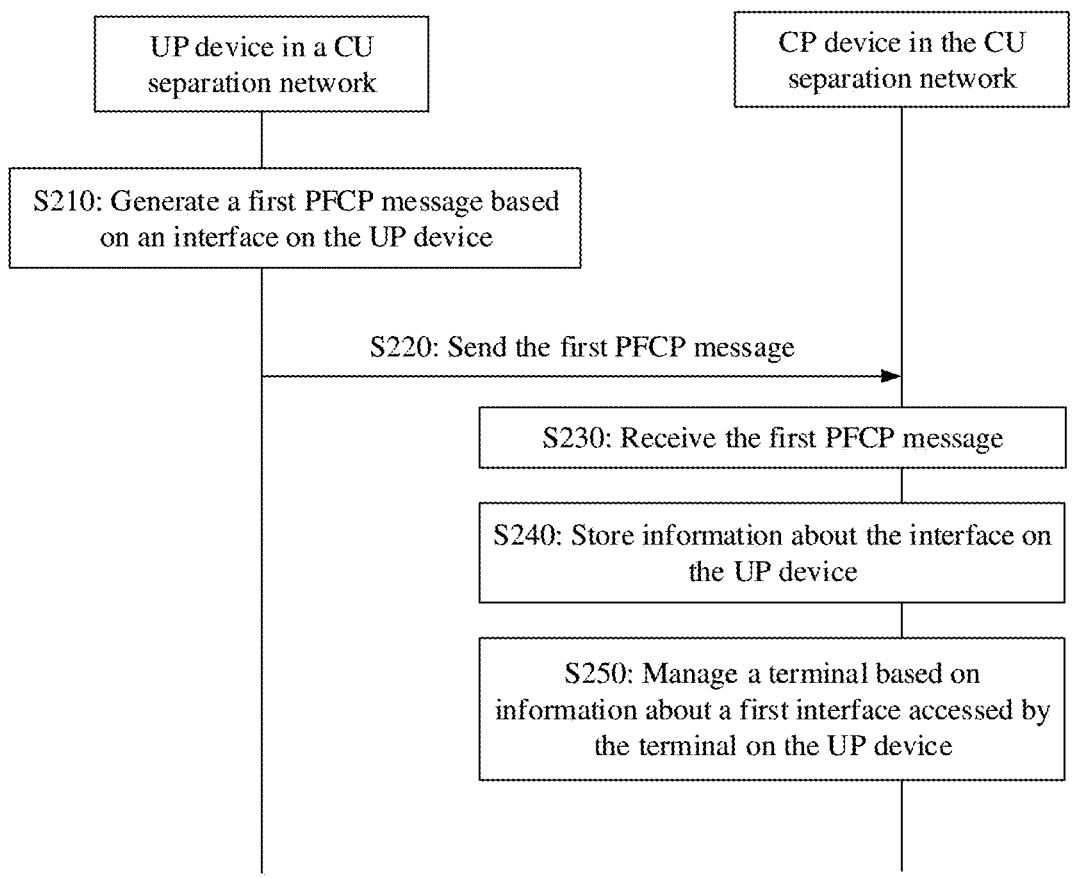
FIG. 16 is a flowchart of a communication method 200 according to an embodiment of this application.

FIG. 16 is a flowchart of a communication method 200 according to an embodiment of this application. The method 200 includes S210 to S250.

In some embodiments, the method 200 is performed interactively by the UP device and the CP device in the system architecture shown in FIG. 1, or is performed interactively by the UP device and the CP device shown in any one of FIG. 3, FIG. 6, FIG. 7, FIG. 8, and FIG. 9. The UP device in the method 200 is a device that performs a UP function in any CU separation network, and the CP device in the method 200 is a device that performs a CP function in any CU separation network. For example, the method 200 is applied to a CU separation gateway, and the CP device and the UP device are respectively a CP device and a UP device in the same gateway. In some embodiments, the CU separation gateway is a BNG, and the CP device and the UP device are respectively a CP device and a UP device in the BNG with CU separation. In some embodiments, the CU separation gateway is a BRAS, and the CP device and the UP device are respectively a CP device and a UP device in the CU separation BRAS.

In some embodiments, the method 200 is processed by a general-purpose central processing unit (CPU), by a CPU and/or a network processor (NP), or by another processor appropriate for packet forwarding instead of a CPU or an NP. This is not limited in the method 200.

S210: An UP device generates a first PFCP message based on an interface on the UP device.

The first PFCP message is a PFCP message for reporting information about the interface on the UP device. The first PFCP message is, for example, a PFCP request. The first PFCP message is, for example, a PFCP node related message. The first PFCP message is, for example, a PFCP report request message.

An implementation of the first PFCP message includes but is not limited to the following manner 1 or manner 2.

Manner 1: A PFCP message expanded with a new message type is the first PFCP message.

For example, the first PFCP message is a first PFCP node related message with a first message type. Specifically, the first PFCP node related message includes a message type field. The message type field in the first PFCP node related message includes a first message type, and the first message type indicates that the first PFCP message is used to report the information about the interface on the UP device. For example, a value of the first message type is 16, and 16 is a node-level message type value reserved in the PFCP, and may be used to indicate that a node-level message is used to report the information about the interface on the UP device. The first PFCP node related message may be referred to as a PFCP UP resource report request.

Manner 2: An existing PFCP message is reused as the first PFCP message.

For example, the first PFCP message is a PFCP node report request message. The PFCP node report request message includes a message type field. The message type field in the PFCP node report request message includes 12.

A type of an interface corresponding to interface information carried in the first PFCP message includes a plurality of cases. The following uses cases A, B, C, and D as examples to describe an interface type corresponding to interface information carried in the first PFCP message.

Case A: Physical Interface

Figure 17:
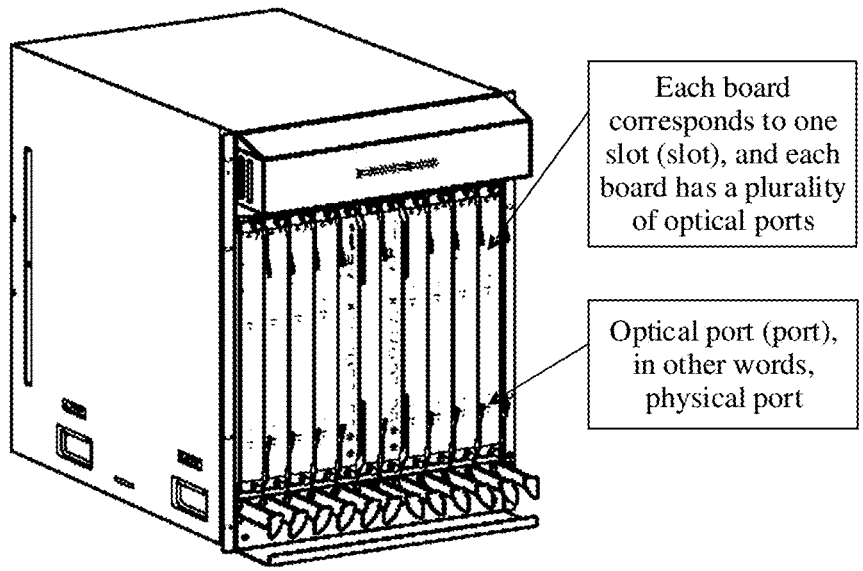
FIG. 17 is a schematic diagram of a BNG according to an embodiment of this application.

The first PFCP message includes information about a physical interface on the UP device. The physical interface is, for example, an optical port. For example, FIG. 17 is an example of a device form of the BNG. For example, the BNG is a rack-shaped device, and a plurality of boards may be installed on a rack. Each board corresponds to one slot (slot), and each board has a plurality of optical ports.

Figure 18:
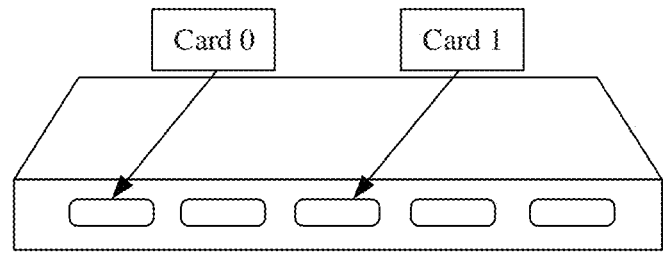
FIG. 18 is a schematic diagram of inserting a plurality of subcards into a board according to an embodiment of this application.

For example, FIG. 18 shows an example that a quantity of subcards that may be inserted into one board is flexible. In the one board shown in FIG. 18, two subcards, namely, card 0 and card 1, are inserted.

Figure 19:
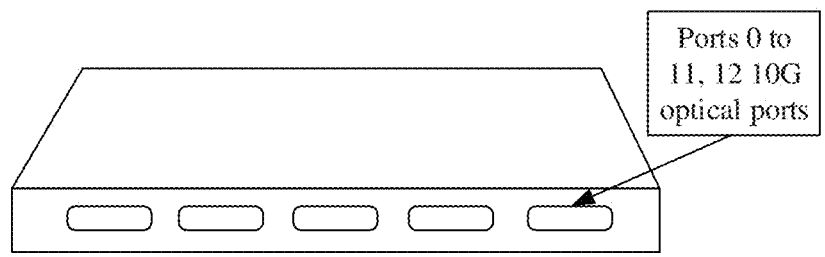
FIG. 19 is a schematic diagram of deploying a plurality of physical interfaces on each subcard according to an embodiment of this application.

For example, FIG. 19 is an example of deploying a plurality of physical interfaces (optical ports) on each subcard. Twelve 10G optical ports, namely, port 0 to port 11, are deployed on each subcard shown in FIG. 19.

An interface name of the physical interface is in a format of interface type/slot number (slot)/card number (card)/port number (port). For example, if the interface name of a physical interface A is GigaEthernet 1/0/2, a type of the physical interface A is GigaEthernet (GE), a slot number of the physical interface A is 1, a card number of the physical interface A is 1, and a port number of the physical interface A is 2.

Case B: Bundled Interface

Figure 20:
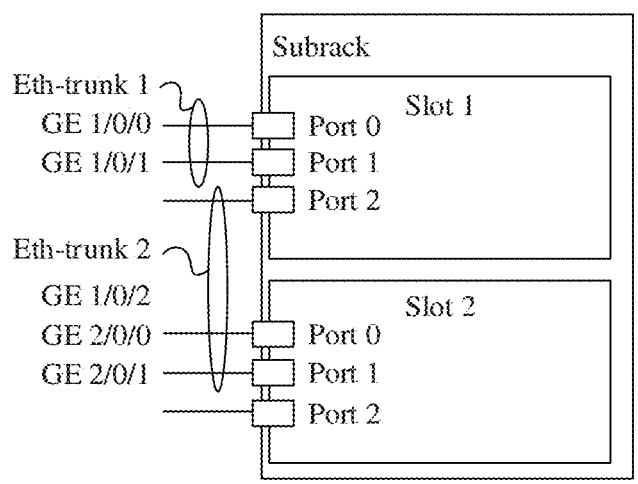
FIG. 20 is a schematic diagram of a bundled interface according to an embodiment of this application.

In some embodiments, the first PFCP message includes information about a bundled interface on the UP device. For example, FIG. 20 is an example of a bundled interface. The bundled interface is a logical interface. The bundled interface is, for example, an Ethernet link aggregation (Eth-trunk) interface or a link aggregation group (LAG) interface. The bundled interface includes a plurality of physical interfaces that have a bundling relationship, and each physical interface is referred to as a member of the bundled interface. For example, FIG. 20 shows two bundled interfaces. An interface name of one bundled interface is Eth-trunk 1, and an interface name of the other bundled interface is Eth-trunk 2. Eth-trunk 1 is formed by bundling physical interfaces GE 1/0/0 and GE 1/0/1. Eth-trunk 2 is formed by bundling GE 1/0/2, GE 2/0/0, and GE 2/0/1. The interface name of the bundled interface is in a format of "interface type number". For example, the interface name of the interface A is Eth-trunk 1, which indicates that a type of the interface A is Eth-trunk and a number of interface A is 1.

Case C: Tunnel Interface

Figure 21:
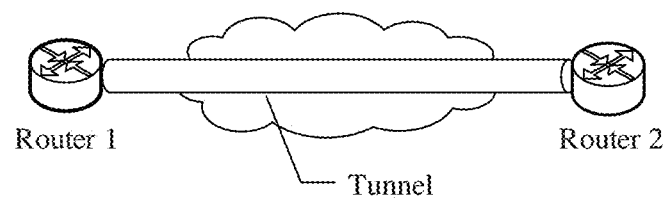
FIG. 21 is a schematic diagram of a tunnel interface according to an embodiment of this application.

In some embodiments, the first PFCP message includes information about a tunnel interface on the UP device. The tunnel interface is a logical interface. The tunnel interface indicates termination of a tunnel. A tunnel type includes but is not limited to at least one of a Multi-Protocol Label Switching (MPLS) tunnel, a generic routing encapsulation (GRE) tunnel, a virtual expanded local area network (Vxlan) tunnel, or a GTP-u tunnel. The tunnel type corresponds to an encapsulation format of the tunnel. For example, the VXLAN tunnel carries VXLAN packets. A destination of a tunnel is usually indicated by a destination IP address of the tunnel. For example, FIG. 21 is an example of a tunnel interface. As shown in FIG. 21, a tunnel is established between a router 1 and a router 2. The router 1 and the router 2 each have a tunnel interface for the tunnel. Either of the router 1 and the router 2 is configured to be the UP device in the BNG. For example, the UP device in the BNG has an interface A, and the interface A is a tunnel interface. An interface name of the interface A is "Interface Tunnel 3", which indicates that the interface type of interface A is tunnel, and a number of the interface A is 3. Information about the interface A further includes "Encap-type gre", indicating that the tunnel type is GRE. The information about the interface A further includes "IP address 2.2.2.2", which indicates that a destination IP address of the tunnel is 2.2.2.2. In other words, the tunnel is terminated on the device with an IP address of 2.2.2.2.

Figure 22:
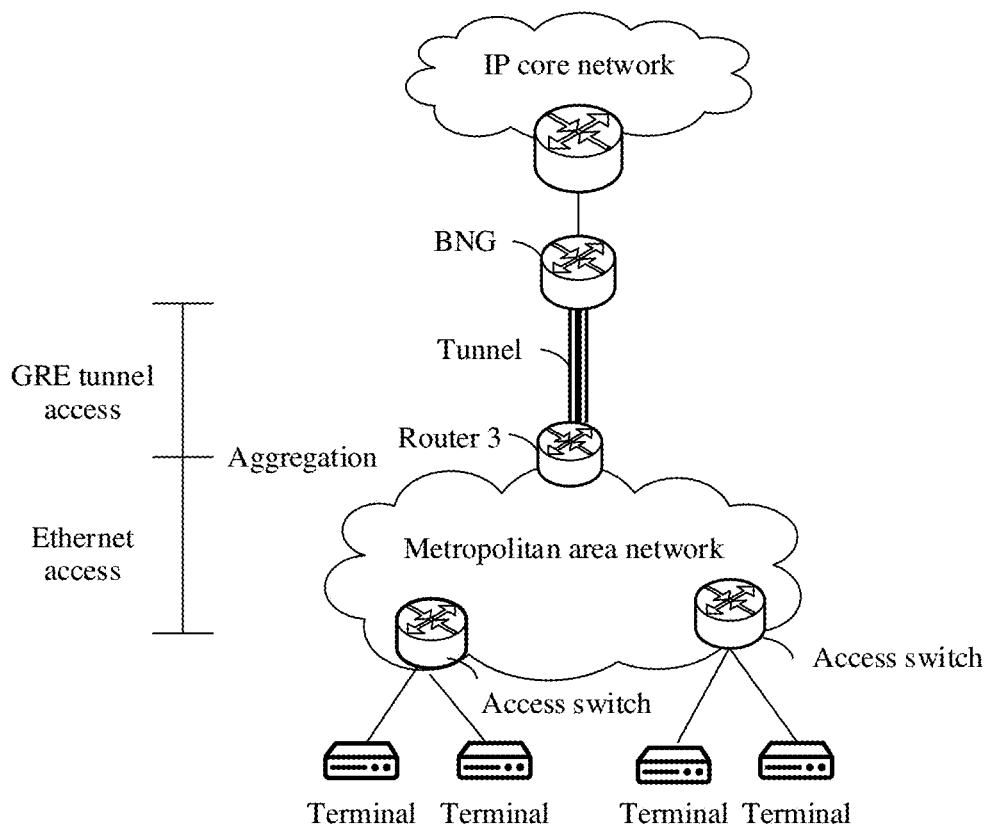
FIG. 22 is a schematic diagram depicting that a BNG accesses a terminal through a GRE tunnel according to an embodiment of this application.

For example, FIG. 22 is an example in which a BNG accesses a terminal through a GRE tunnel. Carrier A leases a metropolitan area network of carrier B to access its customers. The carrier A has a BNG and the carrier B has a router 3. The BNG establishes a GRE tunnel with the router 3 to access terminals via the router 3.

The preceding bundled interfaces and tunnel interfaces are examples of logical interfaces on the UP device. In some other embodiments, the logical interface on the UP device is a virtual Ethernet interface, and the first PFCP message includes information about the virtual Ethernet interface on the UP device.

Case D: Sub-Interface

A bandwidth of a physical interface is usually large, and one physical interface can be accessed by a plurality of clients at the same time. In this case, ports and VLANs identify different clients connected to a same physical port. In a BNG, sub-interfaces are mapped to different ports and VLANs. In addition, in a home broadband network, a carrier uses double VLAN tags to map a home. In this way, a physical location of each client can be easily determined, and location-based authentication can be implemented. Sub-interfaces can be used to plan parameters for different clients, for example, setting bandwidth parameters and authentication policies based on interfaces. The authentication policy, for example, allows only Point to Point Protocol (PPP) access.

Figure 23:
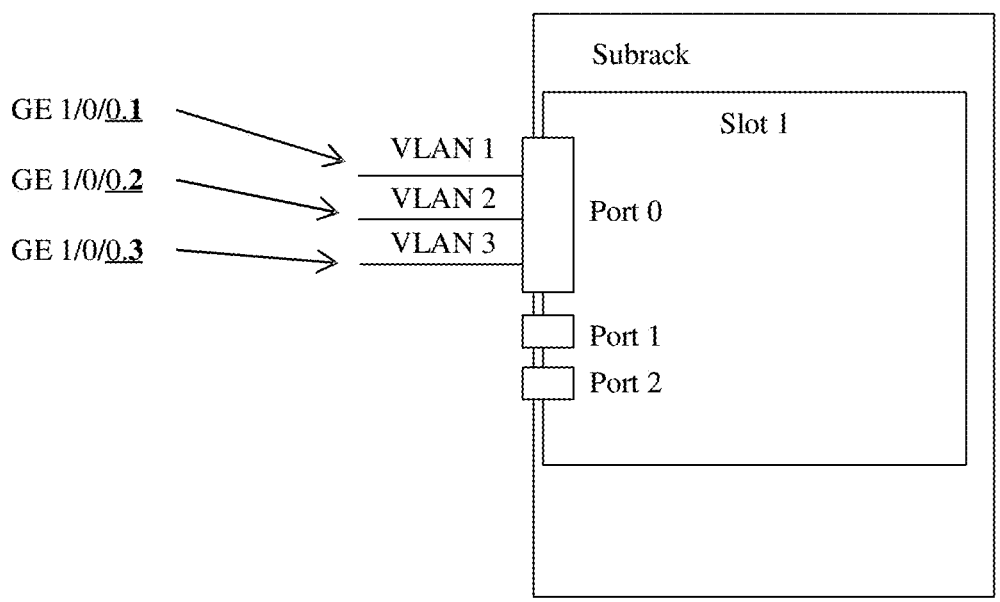
FIG. 23 is a schematic diagram of a sub-interface according to an embodiment of this application.

For example, an interface name of the sub-interface meets a format of "an interface name of an interface to which the sub-interface belongs.sub-interface name". In other words, ".xxx" is added to the interface name to indicate the sub-interface. For example, refer to FIG. 23. Interface GE 1/0/0 includes three sub-interfaces: GE 1/0/0.1, GE 1/0/0.2, and GE 1/0/0.3. GE refers to Gigabit Ethernet. Sub-interface GE 1/0/0.1 corresponds to VLAN 1. Sub-interface GE 1/0/0.1 is named by adding "0.1" to GE 1/0/0. The sub-interface name of GE 1/0/0.1 is 1. Sub-interface GE 1/0/0.2 corresponds to VLAN 2. Sub-interface GE 1/0/0.2 corresponds to VLAN 2. Sub-interface GE 1/0/0.2 is named by adding "0.2" to GE1/0/0. Sub-interface GE 1/0/0.3 corresponds to VLAN 3. Sub-interface GE 1/0/0.3 is named by adding "0.3" to GE1/0/0. The sub-interface name of GE 1/0/0.3 is 3.

A quantity of interfaces on the UP device corresponding to the interface information carried in the first PFCP message includes a plurality of cases. For example, the first PFCP message includes information about one interface on the UP device. As another example, the first PFCP message includes information about a plurality of interfaces on the UP device.

In some embodiments, the UP device uses the first PFCP message to report information about an interface accessed by a terminal. For example, the first PFCP message includes information about a first interface accessed by the terminal on the UP device. The first interface is the interface accessed by the terminal on the UP device.

Information about the interface in the first PFCP message includes an interface index (Interface index). The interface index identifies the interface on the UP device. The interface index is, for example, in a form of a numeric value. In some embodiments, the interface index is encoded as a 32-bit unsigned integer (unsigned 32 binary integer value). The interface index identifies an access interface on the UP device.

In some embodiments, the information about the interface in the first PFCP message further includes at least one of a type of the interface, a bandwidth of the interface, a slot number of a slot in which the interface is located, a card number of an interface card in which the interface is located, a port number corresponding to the interface, an index of a sub-interface of the interface, an interface number of a logical interface, an interface state, and an MTU of the interface.

The first PFCP message includes at least one IE. Each IE includes information about at least one interface on the UP device. A type of the IE included in the first PFCP message includes but is not limited to at least one of a grouped IE and an embedded IE. The embedded IE may be understood as an attribute of a minimum unit. One grouped IE may include a plurality of embedded IEs.

The following uses an example to describe an IE carried in the first PFCP message.

Table 11 below illustrates meanings of the identifiers used in the table exemplifying the IE in the method 200.

TABLE 11

| Classification of whether an IE appears in the method 200 | Description |
| --- | --- |
| Mandatory (M) | Mandatory |
| Conditional (C) | The IE needs to be carried if a specific condition is met. |
| Conditional-Optional (CO) | The IE may be carried if a specific condition is met. |
| Optional (O) | Whether the IE is carried is optional. |

In some embodiments, refer to Table 12. Table 12 is an example of an IE carried in the first PFCP message. For example, IEs carried in a PFCP UP resource report request message and a PFCP node report request message are shown in the following Table 12. The IE carried in the first PFCP message includes but is not limited to at least one of a create interface IE, an update interface IE, and a delete Interface IE. The create interface IE indicates a CP device to create an information entry, and stores, in the created information entry, the information about the interface carried in the first PFCP message. The update interface IE indicates a CP device to update historically stored information about an interface on the UP device to the information about the interface carried in the first PFCP message. The delete interface IE indicates a CP device to delete interface information corresponding to an interface index.

TABLE 12

| Information elements | P | Condition/Comment | IE type |
| --- | --- | --- | --- |
| Node ID | M | Node ID of a UP device | Node ID |
| Create interface description | C | The create interface description is used to create interface information, which may carry a plurality of pieces of information | Create interface description |
| Update interface description | C | The update interface description is used to update interface information, which may carry a plurality of pieces of information | Update interface description |
| Delete interface description | C | The delete interface description is used to delete interface information, which may carry a plurality of pieces of information | Remove interface description |

The following uses (A), (B), and (C) as examples to describe the create interface IE, update interface IE, and delete interface IE.

(A) Create Interface IE

For example, the create interface IE is referred to as a create interface description IE. The create interface IE includes an IE type field. The IE type field includes a first IE type. The first IE type is an expanded new IE type. The first IE type indicates that the interface is newly created. In some embodiments, the create interface IE is a grouped IE. The create interface IE includes at least one embedded IE. The create interface IE includes at least one of an interface index IE, an interface type IE, a bandwidth IE, a slot IE, a card IE, a port IE, a sub-interface index IE, a logical interface index IE, an interface state IE, and an MTU IE.

For example, Table 13 is an example of a create interface IE. The if-index IE in Table 13 is an example of an interface index IE included in the create interface IE. The if-type IE in Table 13 is an example of an interface type IE included in the create interface IE. The bandwidth IE in Table 13 is an example of a bandwidth IE included in the create interface IE. The slot IE in Table 13 is an example of a slot IE included in the create interface IE. The if-sub-index IE in Table 13 is an example of a card IE included in the create interface IE. The if-logic-index IE in Table 13 is an example of a logical interface index IE included in the create interface IE. The if-State IE in Table 13 is an example of an interface state IE included in the create interface IE. The if-MTU IE in Table 13 is an example of an MTU IE included in the create interface IE. In addition, the first byte and the second byte in the create interface IE are the IE type field, and the IE type field carries a value of the IE type, that is, a value of the first IE type. In Table 13, XX in "IE type=XX (decimal)" indicates a decimal value. The third and fourth bytes in the create interface IE are a length field. The fifth and sixth bytes in the create interface IE are an enterprise ID field. "2100" in the enterprise ID field is an example of an enterprise ID.

TABLE 13

| Octet 1 and 2 | Create interface description IE type = XX (decimal) | | |
| --- | --- | --- | --- |
| Octets 3 and 4 | Length = n | | |
| Octets 5 and 6 | Enterprise ID = 2100 | | |
| Information elements | P | Condition/Comment | IE type |
| If-index | M | Index value of an interface | If-index (to be expanded) |
| Source interface | M | A source to which the interface belongs This IE reuses the IE definition in the existing PFCP. Values of an interface value are as follows: 0: access side; 1: core side (network side). | Source interface (existing) |
| If-type | M | Interface type Physical type: GigabyteEthernet GE category Logical type: LAG category bundled interface (a plurality of GE interfaces form a bundled interface) Virtual Ethernet (Virtual-Ethernet) interface GRE tunnel | If-type (to be expanded) |
| Bandwidth | C | Interface bandwidth Report a bandwidth of a physical interface, in Gbit/s. If the interface is a logical interface, a bandwidth is not reported. | Bandwidth (to be expanded) |
| If-slot | C | Number of a slot in which a physical interface is located | Slot (to be expanded) |
| If-card | C | Number of a card at which a physical interface is located (one slot may have a plurality of cards) | Card (to be expanded) |
| If-port | C | Port location at which a physical interface is located (one card may have a plurality of port locations) | Port (to be expanded) |
| If-sub-index | C | Index of a sub-interface Physical interfaces do not carry the sub-interface IE. A sub-interface type of a logical interface carries this attribute. Generally, a sub-interface identifies a VLAN range of a physical interface. | If-sub-index (to be expanded) |
| If-logic-index | C | Index of a logical interface | If-logic-index (to be expanded) |
| If-state | M | State of an interface | If-state (to be expanded) |
| If-MTU | M | IPv4/IPv6 MTU value of an interface | If-MTU (to be expanded) |

TABLE 13-continued

The following uses examples 1 to 4 to describe how the UP device reports the information about the interface to a CP device by using the create interface IE. In the following four examples, an access interface A, an access interface B, an access interface C, and an access interface D are all examples of a terminal access interface (Access interface) on the UP device.

Example 1: The UP device has one access interface A. The access interface A is a GE interface, and a name of the access interface A is "GE 3/1/0". The UP device uses the foregoing create interface IE, and a list of IEs reported to the access interface A includes "If-index=xxx; source interface=access; if-type=GE; slot=3; card=1; port=0; bandwidth=1G; if-state=UP; if-MTU=ipv4 1500, ipv6 1460".

Example 2: The UP device has one access interface B. The access interface B is a GE sub-interface, and a name of the access interface B is "GE3/1/0.200". The UP device uses the foregoing create interface IE, and a list of IEs reported to access interface B includes "If-index=xxx; source interface=access; if-type=GE; slot=3; card=1; port=0; if-sub-index=200; bandwidth=1G; if-state=UP; if-MTU=ipv4 1500, ipv6 1460".

Example 3: The UP device has one access interface C. The access interface C is a LAG bundled interface, and a name of the access interface C is "LAG 100". The UP device uses the foregoing create interface IE, and a list of IEs reported to the access interface C includes "If-index=xxx; source interface=access; if-type=LAG; if-logic-index=200; if-state=UP; if-MTU=ipv4 1500, ipv6 1460".

Example 4: The UP device has one access interface D. The access interface D is a LAG bundled sub-interface, and a name of the access interface D is "LAG 100.123". The UP device uses the foregoing create interface IE, and a list of IEs reported to the access interface D includes "If-index=xxx; source interface=access; if-type=LAG; if-logic-index=200; if-sub-index=123; if-state=UP; if-MTU=ipv4 1500, ipv6 1460".

(B) Update Interface IE

The update interface IE is, for example, referred to as an update interface description IE (Update Interface Description IE). The update interface IE includes an IE type field. The IE type field includes a second IE type. The second IE type is an expanded new IE type. The second IE type indicates that information about an interface is updated. In some embodiments, the update interface IE is a grouped IE. The update interface IE includes at least one embedded IE. The update interface IE includes an interface index IE.

The update interface IE includes updated interface information. In some embodiments, the UP device detects whether information about an interface is updated. When information about any dimension of any interface is updated, the UP device carries updated information about the dimension of the interface in an update interface IE, and the UP device transfers the update interface IE to the CP device, so that the UP device reports the updated information of the dimension of the interface to the CP device.

For example, the update interface IE includes an updated interface state. For example, the update interface IE includes an interface state IE, and the interface state IE includes an updated interface state. For example, when a state of the interface A on the UP device changes from an up state to a down state, the UP device carries an index of the interface A in an interface index IE of an update interface IE, and the UP device carries a state (for example, down) of the interface A in an interface state IE of the update interface IE. The UP device transfers the update interface IE to the CP device. After the CP device receives the update interface IE, the CP device determines, by identifying the interface index IE and the interface state IE that are in the update interface IE, that the state of the interface A changes, and the CP device updates a state that is of the interface A and that is stored in the CP device from the up state to the down state. Similarly, when a state of the interface A on the UP device changes from a down state to an up state, the UP device reports to the CP device in a similar manner by using an update interface IE that the state of the interface A changes to the up state.

For example, the update interface IE includes an updated MTU of an interface. For example, the update interface IE includes an MTU IE. The MTU IE includes the updated MTU of the interface. For example, when an IPv4 MTU value of the interface B on the UP device changes from a value 1 to a value 2, the UP device carries an index of the interface B in an interface index IE of an update interface IE, and the UP device carries the IPv4 MTU value (value 2) of interface B in an MTU IE of the update interface IE. The UP device transfers the update interface IE to the CP device. After the CP device receives the update interface IE, the CP device determines, by identifying the interface index IE and the MTU IE in the update interface IE, that the IPv4 MTU value of the interface B changes. The CP device updates a state that is of interface B and that is stored in the CP device from the value 1 to the value 2.

For example, Table 14 is an example of an update interface IE. The if-index IE in Table 14 is an example of an interface index IE included in the update interface IE. The if-state IE in Table 14 is an example of an interface state IE included in the update interface IE. The if-MTU IE in Table 14 is an example of an MTU IE included in the update interface IE. In addition, the first byte and the second byte in the update interface IE are the IE type field, and the IE type field carries a value of the IE type, that is, a value of the second IE type. In Table 14, XX in "IE type=XX (decimal)" indicates a decimal value. The third and fourth bytes in the update interface IE are a length field. The fifth and sixth bytes in the update interface IE are an enterprise ID field. "2100" in the enterprise ID field is an example of an enterprise ID.

TABLE 14

| Octet 1 and 2 | Update interface description IE type = XX (decimal) | | |
|---|---|---|---|
| Octets 3 and 4 | Length = n | | |
| Octets 5 and 6 | Enterprise ID = 2100 | | |
| Information elements | P | Condition/Comment | IE type |
| If-index | M | Index value of an interface | If-index (to be expanded) |

TABLE 14-continued

| | | | |
|---|---|---|---|
| If-state | C | Interface state (up/down). The if-state IE is carried if the state changes. | If-state (to be expanded) |
| If-ipv4-MTU | C | IPv4 MTU value of the interface. The if-ipv4-MTU is carried if the value is changed. | If-MTU (to be expanded) |
| If-ipv6-MTU | C | IPv6 MTU value of the interface. The if-ipv4-MTU is carried if the value is changed. | If-MTU (to be expanded) |

(C) Delete Interface IE

For example, the delete interface IE is referred to as a delete interface description IE. The delete interface IE includes an IE type field. The IE type field includes a third IE type. The third IE type is an expanded new IE type. The third IE type indicates that an interface has been deleted. In some embodiments, the delete interface IE is a grouped IE. The delete interface IE includes at least one embedded IE. The delete interface IE includes an interface index IE.

For example, Table 15 is an example of a delete interface IE. The if-index IE in Table 15 is an example of an interface index IE included in the delete interface IE. In addition, the first byte and the second byte in the delete interface IE are the IE type field, and the IE type field carries a value of the IE type, that is, a value of the second IE type. In Table 15, XX in "IE type=XX (decimal)" indicates a decimal value. The third and fourth bytes in the delete interface IE are a length field. The fifth and sixth bytes in the delete interface IE are an enterprise ID field. "2100" in the enterprise ID field is an example of an enterprise ID.

TABLE 15

| | | | |
|---|---|---|---|
| Octet 1 and 2 | Delete interface description IE type = XX (decimal) | | |
| Octets 3 and 4 | Length = n | | |
| Octets 5 and 6 | Enterprise ID = 2100 | | |
| Information elements | P | Condition/Comment | IE type |
| If-index | M | Index value of an interface | If-index (to be expanded) |

The following describes the interface index IE, the interface type IE, the bandwidth IE, the slot IE, the card IE, the port IE, the sub-interface index IE, the logical interface index IE, the interface state IE, and the MTU IE that are mentioned above by using (1) to (10). For example, the first PFCP message includes at least one of the interface index IE, the interface type IE, the bandwidth IE, the slot IE, the card IE, the port IE, the sub-interface index IE, the logical interface index IE, the interface state IE, and the MTU IE that are introduced below.

(1) Interface Index IE

For example, the interface index IE is referred to as an if-index IE. In some embodiments, the interface index IE is an embedded IE. The interface index IE includes an index of an interface. For example, Table 16 is an example of an interface index IE. The interface index IE includes an IE type field, a length field, an enterprise ID field, and an interface index (Interface index) field. The interface index field includes an index of the interface.

TABLE 16

| Octets | Bits | | | | | | | |
|---|---|---|---|---|---|---|---|---|
| | 8 | 7 | 6 | 5 | 4 | 3 | 2 | 1 |
| 1 to 2 | Type = NN decimal | | | | | | | |
| 3 to 4 | Length = n | | | | | | | |
| 5 to 6 | Enterprise ID (2100) | | | | | | | |
| 7 to 10 | Interface index | | | | | | | |

(2) Interface Type IE

For example, the interface type IE is referred to as an if-type IE. The interface type IE includes a type of an interface on the UP device. In some embodiments, the interface type IE is an embedded IE. For example, Table 17 is an example of an interface type IE. The interface type IE includes an IE type field, a length field, an enterprise ID field, and an interface type (Interface type) field. The interface type field includes the type of the interface. The type of the interface includes a physical interface, a bundled interface, a virtual Ethernet interface, or a tunnel interface.

TABLE 17

| Octets | Bits | | | | | | | |
|---|---|---|---|---|---|---|---|---|
| | 8 | 7 | 6 | 5 | 4 | 3 | 2 | 1 |
| 1 to 2 | Type = NN decimal | | | | | | | |
| 3 to 4 | Length = n | | | | | | | |
| 5 to 6 | Enterprise ID (2100) | | | | | | | |
| 7 to 7 | Interface type | | | | | | | |

Optionally, the type of the interface is encoded as a 1-byte unsigned integer. For example, refer to Table 17. The interface type field in the interface type IE occupies 1 byte. In some embodiments, different integers represent different interface types. For example, if a value of a type of an interface is 0, the interface is a physical GE (Gigabyte Ethernet) interface. If a value of a type of an interface is 1, the interface is a LAG bundled interface (a plurality of GE interfaces form a logical interface). If a value of a type of an interface is 2, the interface is a virtual Ethernet interface. If a value of a type of an interface is 3, the interface is a GRE tunnel termination interface (GRE Tunnel).

(3) Bandwidth IE

For example, the bandwidth IE is referred to as a bandwidth IE. The bandwidth IE includes a bandwidth of an interface on the UP device. In some embodiments, the bandwidth IE is an embedded IE. For example, Table 18 is an example of a bandwidth IE. The bandwidth IE includes an IE type field, a length field, an enterprise ID field, and a bandwidth field. Optionally, the bandwidth is encoded as a 4-byte unsigned integer, and a unit of the bandwidth is Gbit/s (Giga bits per second, a quantity of bits transmitted per second).

TABLE 18

| Octets | Bits | | | | | | | |
|---|---|---|---|---|---|---|---|---|
| | 8 | 7 | 6 | 5 | 4 | 3 | 2 | 1 |
| 1 to 2 | Type = NN decimal | | | | | | | |
| 3 to 4 | Length = n | | | | | | | |
| 5 to 6 | Enterprise ID (2100) | | | | | | | |
| 7 to 10 | Bandwidth | | | | | | | |

(4) Slot IE

The slot IE is, for example, referred to as a slot IE. The slot IE includes a slot number of a slot in which an interface on the UP device is located. In some embodiments, the slot IE is an embedded IE. For example, Table 19 is an example of a slot IE. The slot IE includes an IE type field, a length field, an enterprise ID field, and a slot field. The slot field includes the slot number. Optionally, the slot number is encoded as a 2-byte unsigned integer.

TABLE 19

| Octets | Bits | | | | | | | |
|---|---|---|---|---|---|---|---|---|
| | 8 | 7 | 6 | 5 | 4 | 3 | 2 | 1 |
| 1 to 2 | Type = NN decimal | | | | | | | |
| 3 to 4 | Length = n | | | | | | | |
| 5 to 6 | Enterprise ID (2100) | | | | | | | |
| 7 to 8 | Slot | | | | | | | |

(5) Card IE

The card IE is, for example, referred to as a card IE. In some embodiments, the card IE is an embedded IE. The card IE includes a card number of an interface card at which an interface on the UP device is located. For example, Table 20 is an example of a card IE. The card IE includes an IE type field, a length field, an enterprise ID field, and a card field. The card field includes the card number. Optionally, the card number is encoded as a 2-byte unsigned integer.

TABLE 20

| Octets | Bits | | | | | | | |
|---|---|---|---|---|---|---|---|---|
| | 8 | 7 | 6 | 5 | 4 | 3 | 2 | 1 |
| 1 to 2 | Type = NN decimal | | | | | | | |
| 3 to 4 | Length = n | | | | | | | |
| 5 to 6 | Enterprise ID (2100) | | | | | | | |
| 7 to 8 | Card | | | | | | | |

(6) Port IE

The port IE is referred to as, for example, a port IE. The port IE includes a port number corresponding to an interface on the UP device. For example, Table 21 is an example of a card IE. The card IE includes an IE type field, a length field, an enterprise ID field, and a port (Port) field. The port field includes the port number. Optionally, the port number is encoded as a 2-byte unsigned integer.

TABLE 21

| Octets | Bits | | | | | | | |
|---|---|---|---|---|---|---|---|---|
| | 8 | 7 | 6 | 5 | 4 | 3 | 2 | 1 |
| 1 to 2 | Type = NN decimal | | | | | | | |
| 3 to 4 | Length = n | | | | | | | |
| 5 to 6 | Enterprise ID (2100) | | | | | | | |

TABLE 21-continued

| Octets | Bits | | | | | | | |
|---|---|---|---|---|---|---|---|---|
| | 8 | 7 | 6 | 5 | 4 | 3 | 2 | 1 |
| 7 to 8 | Port | | | | | | | |

(7) Sub-Interface Index IE

For example, the sub-interface Index IE is referred to as an if-sub-index IE. The sub-interface index IE includes an index of a sub-interface of an interface. In some embodiments, the sub-interface index IE is an embedded IE. For example, Table 22 is an example of a sub-interface index IE. The sub-interface index IE includes an IE type field, a length field, an enterprise ID field, and a sub-interface index (Sub-index) field. The sub-interface index field includes the index of the sub-interface. The index of the sub-interface identifies the sub-interface on the UP device. The index of the sub-interface is also referred to as a sub-interface number. Optionally, the index of the sub-interface is encoded as a 4-byte unsigned integer.

TABLE 22

| Octets | Bits | | | | | | | |
|---|---|---|---|---|---|---|---|---|
| | 8 | 7 | 6 | 5 | 4 | 3 | 2 | 1 |
| 1 to 2 | Type = NN decimal | | | | | | | |
| 3 to 4 | Length = n | | | | | | | |
| 5 to 6 | Enterprise ID (2100) | | | | | | | |
| 7 to 10 | Sub-index | | | | | | | |

(8) Logical Interface Index IE

For example, the logical interface index IE is referred to as an if-logic-index IE. The logical interface index IE is for reporting information about a logical interface on the UP device. The logical interface index IE includes an interface number of the logical interface. In some embodiments, the logical interface index IE is an embedded IE. For example, Table 23 is an example of a logical interface index IE. The logical interface index IE includes an IE type field, a length field, an enterprise ID field, and a logical interface index (Logic-index) field. The logical interface index field includes the interface number of the logical interface. Optionally, the interface number of the logical interface is encoded as a 4-byte unsigned integer.

TABLE 23

| Octets | Bits | | | | | | | |
|---|---|---|---|---|---|---|---|---|
| | 8 | 7 | 6 | 5 | 4 | 3 | 2 | 1 |
| 1 to 2 | Type = NN decimal | | | | | | | |
| 3 to 4 | Length = n | | | | | | | |
| 5 to 6 | Enterprise ID (2100) | | | | | | | |
| 7 to 10 | Logic-index | | | | | | | |

(9) Interface State IE

The interface state IE is referred to as, for example, an if-state IE. The interface state IE includes a state of an interface. In some embodiments, the interface state IE is an embedded IE. For example, Table 24 is an example of an interface state IE. The interface state IE includes an IE type field, a length field, an enterprise ID field, and an interface state (If-state) field. The interface state field includes the state of the interface. The state of the interface is an up state or a down state. In some embodiments, the two different interface states, the up state and the down state, are represented by different values. For example, the state of the interface is encoded as a 1-byte unsigned integer. 0 indicates up, and 1 indicates down.

TABLE 24

| Octets | Bits | | | | | | | |
|---|---|---|---|---|---|---|---|---|
| | 8 | 7 | 6 | 5 | 4 | 3 | 2 | 1 |
| 1 to 2 | Type = NN decimal | | | | | | | |
| 3 to 4 | Length = n | | | | | | | |
| 5 to 6 | Enterprise ID (2100) | | | | | | | |
| 7 to 7 | If-state | | | | | | | |

(10) MTU IE

The MTU IE is, for example, referred to as an if-MTU IE. The MTU IE includes an MTU of the interface. For example, the MTU IE includes at least one of an IPv4 MTU or an IPv6 MTU of an interface. In some embodiments, the MTU IE is an embedded IE. For example, Table 25 is an example of an MTU IE. The MTU IE includes an IE type field, a length field, an enterprise ID field, an interface IPv4 MTU (If-ipv4-MTU) field, and an interface IPv6 MTU (If-ipv6-MTU) field. The interface IPv4 MTU field includes the IPv4 MTU of the interface. The interface IPv6 MTU field includes the IPv6 MTU of the interface. Optionally, both the IPv4 MTU and the IPv6 MTU of the interface are encoded as 2-byte unsigned integers. Optionally, units of the IPv4 MTU of the interface and the IPv6 MTU of the interface are bytes.

TABLE 25

| Octets | Bits | | | | | | | |
|---|---|---|---|---|---|---|---|---|
| | 8 | 7 | 6 | 5 | 4 | 3 | 2 | 1 |
| 1 to 2 | Type = NN decimal | | | | | | | |
| 3 to 4 | Length = n | | | | | | | |
| 5 to 6 | Enterprise ID (2100) | | | | | | | |
| 7 to 8 | If-ipv4-MTU | | | | | | | |
| 9 to 10 | If-ipv6-MTU | | | | | | | |

S220: The UP device sends the first PFCP message to a CP device.

S230: The CP device receives the first PFCP message from the UP device.

In some embodiments, after the CP device receives the first PFCP message from the UP device, the CP device generates a second PFCP message, and the CP device sends the second PFCP message to the UP device. The second PFCP message is a response message corresponding to the first PFCP message. The second PFCP message is, for example, a PFCP node related message. The second PFCP message is, for example, a PFCP report response message. The second PFCP message notifies the UP device that the CP device has received the first PFCP message. The UP device receives the second PFCP message from the CP device, and the UP device determines, based on the second PFCP message, that the CP device has received the first PFCP message. In some other embodiments, if the UP device does not receive the second PFCP message within a timeout period, the UP device retransmits the first PFCP message to the CP device until receiving the second PFCP message, to ensure that the first PFCP message is successfully transferred to the CP device.

Implementations of the second PFCP message include but are not limited to the following manner 1 and manner 2.

Manner 1: A PFCP message expanded with a new message type is the second PFCP message.

For example, the second PFCP message is a second PFCP node related message with a second message type. Specifically, the second PFCP node related message includes a message type field. The message type field in the second PFCP node related message includes a second message type, and the second message type identifies that the second PFCP message is a response message corresponding to the first PFCP node related message. Values of the second message type and the first message type are different. For example, refer to Table 26. A value of the second message type is 17, and 17 is a node-level message type value reserved in the PFCP and may be used to indicate the response message corresponding to the first PFCP message. The second PFCP node related message may be referred to as a PFCP UPF Resource Report Response.

TABLE 26

| Message type value (decimal) | Message |
|---|---|
| 16 | PFCP UPF resource report request |
| | PFCP UPF resource report request |
| 17 | PFCP UPF Resource Report Response |
| | PFCP UPF resource report response |

Manner 2: An existing PFCP message is reused as the second PFCP message.

For example, the second PFCP message is a PFCP node report response. The PFCP node report response includes a message type field. The message type field in the PFCP node report response includes 13. For example, Table 27 is an example of a PFCP node report request message and a PFCP node report response.

TABLE 27

| Message type value (decimal) | Message |
|---|---|
| 12 | PFCP node report request |
| | PFCP node report request message |
| 13 | PFCP node report response |
| | PFCP node report response |

The second PFCP message includes at least one IE. In some embodiments, refer to Table 28. Table 28 is an example of an IE carried in the second PFCP message. For example, IEs carried in a PFCP UP resource report response and a PFCP node report response are shown in the following Table 28.

TABLE 28

| Information elements | P | Condition/Comment | IE type |
|---|---|---|---|
| Node ID | M | Node ID of a CP device | Node ID |
| Cause | M | Processing result, "successful" indicates that the processing is successful, and other codes are error codes. | Cause |

S240: The CP device stores the information about the interface on the UP device.

The CP device obtains the information about the interface on the UP device from the first PFCP message, to determine the information about the interface accessed by the terminal on the UP device, so that the information about the interface is used for processing terminal access.

How the CP device uses the information about the interface on the UP device includes a plurality of scenarios, and S250 is used as an example below.

S250: The CP device manages the terminal based on the information about the first interface accessed by the terminal on the UP device.

The following uses cases 1, 2, 3, 4, and 5 as examples to illustrate S250.

Case 1: Terminal Access Authentication

Specifically, the CP device generates an access authentication packet including the information about the first interface based on the information about the first interface. The CP device sends the access authentication packet to an authentication server. The authentication server receives the access authentication packet, and obtains the information about the first interface from the access authentication packet. The authentication server performs access authentication on the terminal based on the information about the first interface.

The case 1 is, for example, a binding authentication scenario. The information about the first interface used in the case 1 is equivalent to location information of the terminal. The information about the first interface used in the case 1 includes, for example, at least one of a slot number of a slot in which the first interface is located, a card number of an interface card in which the first interface is located, a port number corresponding to the first interface, and a type of the first interface. For example, when the terminal accesses, the CP device determines that the terminal accesses the first interface on the UP device, and queries prestored interface information of the UFP based on the index of the first interface, to obtain the slot number, the card number, the port number, and the type of the first interface. The CP device generates an authentication request packet that includes the slot number, the card number, the port number, and the type of the first interface, and a terminal identifier, and sends the authentication request packet to the authentication server. The authentication server obtains the slot number, the card number, the port number, the type, and the terminal identifier of the first interface from the access authentication packet. The authentication server determines, based on the information about the first interface, an access location of a terminal corresponding to the terminal identifier. The authentication server determines, based on the access location, whether access of the terminal is normal access or abnormal access. If the authentication server determines, based on the access location, that the access is abnormal access, the authentication server rejects the terminal in passing authentication. When the terminal is an IPoE terminal, the terminal identifier is, for example, a MAC address of the IPoE terminal. When the terminal is a PPPoE terminal, the terminal identifier is, for example, an account of the PPPoE terminal. For example, when the authentication server determines that a location corresponding to the account is incorrect, the authentication server determines that the account of the IPoE terminal may have been stolen.

Figure 24:
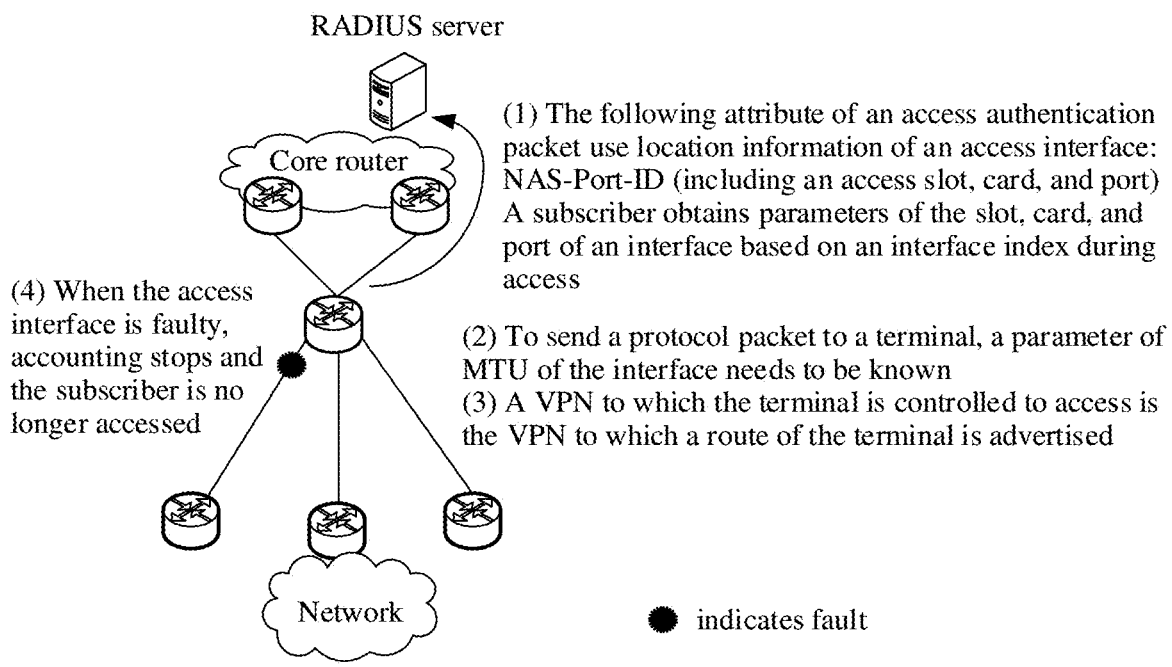
FIG. 24 is a schematic diagram of an application scenario of interface information of a UP device according to an embodiment of this application.

In some embodiments, referring to (i) in FIG. 24, the information about the first interface used in the case 1 is a NAS-Port-ID attribute in an access authentication packet. For example, referring to (i) in FIG. 24, the access authentication packet includes the NAS-Port-ID attribute. The NAS-Port-ID attribute is a character string. The NAS-Port-ID attribute includes a device name, an interface type, an access slot/card/port, and a VLAN tag. For example, the NAS-Port-ID attribute is Relay-identifier GE 3/0/0:100.33.

A slot is 3, a card is 0, a port is 0, an outer VLAN tag is 100, and an inner VLAN tag is 33.

In some embodiments, the case 1 is a RADIUS authentication scenario. Specifically, it is defined in the TR101 specification that a BNG needs to carry a NAS-Port-ID attribute to pass RADIUS authentication. After obtaining the information about the first interface, the CP device constructs a NAS-Port-ID attribute based on the information about the first interface, and sends an access authentication packet including the NAS-Port-ID attribute to the RADIUS server, to request authentication from the RADIUS server. The NAS-Port-ID attribute includes the information about the first interface. In the RADIUS authentication scenario, the CP device in the BNG with CU separation is a RADIUS client. Herein, the RADIUS server is an example of an authentication server.

Case 2: Generating a DHCP Option 82

The option 82 is a relay agent information option (relay agent information option) in a DHCP packet. When a DHCP client sends a request packet to a DHCP server, if the request packet passes through a DHCP relay, the DHCP relay adds an option 82 to the request packet. The DHCP packet includes a DHCP packet header, an IP header, a UDP header, and a plurality of options. A length of a DHCP packet header is 236 bytes. A length of an IP header and a UDP header is 28 bytes. Generally, a length of a DHCP packet is about 500 bytes.

Specifically, the CP device generates a DHCP packet based on the information about the interface on the UP device. The DHCP packet includes a DHCP option 82 that includes the information about the interface on the UP device. The CP device sends the DHCP packet to a DHCP server. The DHCP server receives the DHCP packet and identifies an access location of a terminal based on an option 82 field in the DHCP packet. The DHCP server performs binding and authentication on the terminal or selects an IP address based on the access location of the terminal.

Figure 25:
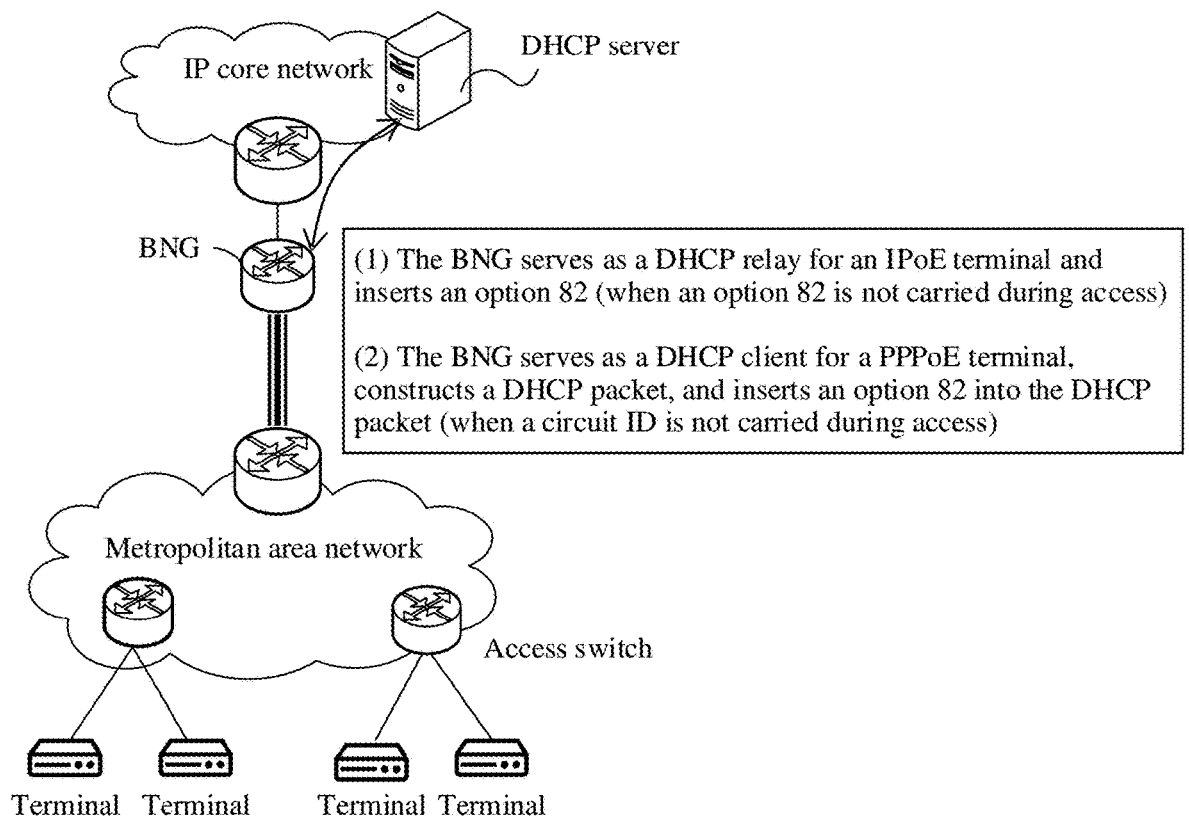
FIG. 25 is a schematic diagram depicting that a BNG serves as a DHCP relay according to an embodiment of this application.

When the terminal is an IPoE terminal, the BNG serves as a DHCP relay, constructs a DHCP option 82, and inserts the DHCP option 82 into a DHCP packet (if the packet does not carry a DHCP option 82 during access). When the terminal is a PPPoE terminal, the BNG serves as a DHCP client, constructs a DHCP packet, and inserts a DHCP option 82 into the packet (if the packet does not carry a circuit ID during access). For example, FIG. 25 is an example in which the BNG serves as a DHCP relay.

A format of an option 82 defined in RFC 3046 is as follows:

```
Code  Len  Agent Information Field
+------+------+------+------+------+------+-- ... -+------+
| 82   | N    | i1   | i2   | i3   | i4   |   | iN   |
+------+------+------+------+------+------+-- ... -+------+

SubOpt  Len  Sub-Option Value
+------+------+------+------+------+------+-- ... -+------+
| 1    | N    | s1   | s2   | s3   | s4   |   | sN   |
+------+------+------+------+------+------+-- ... -+------+

SubOpt  Len  Sub-Option Value
+------+------+------+------+------+------+-- ... -+------+
| 2    | N    | i1   | i2   | i3   | i4   |   | iN   |
+------+------+------+------+------+------+-- ... -+------+
```

| DHCP Agent | |
|---|---|
| Sub-Option Code | Sub-Option Description |
| 1 | Agent Circuit ID Sub-Option |
| 2 | Agent Remote ID Sub-Option |

The option 82 includes two sub-attributes. One sub-attribute is an agent circuit ID, and the other sub-attribute is an agent remote ID. The agent circuit ID and the agent remote ID are defined by the vendor. The sub-attribute is, for example, a sub-option of the option 82. The agent circuit ID is, for example, an agent circuit ID sub-option. The agent circuit ID sub-option includes a router interface number, a switching hub port number, a remote access server port number, a frame relay DLCI, an ATM virtual circuit number, and a cable data virtual circuit number. The agent remote ID is, for example, an agent remote ID sub-option. The agent remote ID sub-option includes a "caller ID" phone number for dial-up connection, a "user name" prompted for by a remote access server, a remote caller ATM address, a modem ID of a cable data modem, a remote IP address of a point-to-point link, and a remote X.25 address for X.25 connection.

For example, the option 82 includes a parameter basinfo-insert. The parameter basinfo-insert specifies inserted BAS interface information. For example, for a GE interface, a parameter basinfo-insert includes <BNG-Hostname> eth <0>/<slot>/<subslot>/<port>:<outer VLAN>.<inner VLAN>. For example, the parameter basinfo-insert includes Hostname1 eth 0/1/0/1:50.60. For example, if the interface is a trunk interface, a parameter basinfo-insert includes <BNG-Hostname> trunk <0>/<0>/<slot>/<trunkid>:<outer VLAN>.<inner VLAN>. For example, the parameter basinfo-insert includes Hostname1 trunk 0/0/2/11:200.100. A BAS interface is an interface for accessing a broadband subscriber.

For example, the option 82 includes a parameter cn-telecom. The parameter cn-telecom specifies a format of inserted BAS interface information to be in a format of telecom. The parameter cn-telecom includes physical information in a telecom format and information carried by the terminal. The physical information in the telecom format is, for example, an interface type, a slot number, a subcard number, and port number/VLAN information. For example, for a GE interface, a parameter cn-telecom includes eth <slot>/<subslot>/<port>:<outer VLAN>.<inner VLAN>. For example, if the interface is a trunk interface, a parameter cn-telecom includes trunk 0/2/<trunk-id>:<outer VLAN>.<inner VLAN>. For example, information carried by a terminal is abc, and the option 82 includes eth 2/0/5:4096.4 abc.

For example, the option 82 includes a parameter version1. The parameter version1 indicates to encapsulate access line ID (access-line-id) information in a format of version1. The parameter version1 includes physical information in a telecom format and 0/0/0/0/0/0. The physical information in the telecom format is, for example, an interface type, a slot number, a subcard number, and port number/VLAN information. For example, for a GE interface, a parameter version1 includes eth <slot>/<subslot>/<port>:<outer VLAN>.<inner VLAN>. For example, if the interface is a trunk interface, a parameter version1 includes trunk 0/2/<trunk-id>:<outer VLAN>.<inner VLAN>. For example, the option 82 includes eth 2/0/5:4096.4 0/0/0/0/0/0.

Case 3: Application of a Bandwidth of an Interface

For example, when a terminal A accesses a physical interface A on the UP device in the BNG, the CP device in the BNG determines a required bandwidth of the terminal A. If a terminal B and a terminal C are further connected to the physical interface A, the CP device calculates a sum of the required bandwidth of the terminal A, a required bandwidth of the terminal B, and a required bandwidth of the terminal C, to obtain a total required bandwidth of all terminals connected to the physical interface A. When the total required bandwidth exceeds a specific proportion of an actual bandwidth of the physical interface A, the CP device restricts new terminals to accessing the physical interface A, and generates an alarm.

Case 4: Application of an MTU of an Interface

For example, a CP device sends a control packet to a terminal based on an MTU of an interface. For example, refer to (2) in FIG. 24. When sending a packet to the terminal, the CP device determines whether the MTU of the interface is set to an excessively small value and the MTU cannot be used for sending the packet.

Case 5: Application of an Interface State

For example, refer to (4) in FIG. 24. When a physical fiber connected to an interface or a board on which the interface is located is faulty, a state reported by the UP device changes to down, the CP device determines that the state of the interface changes to down, and the CP device performs service protection for a terminal accessed via the interface. For example, the CP device performs offline processing on the terminal accessed via the interface, stops accounting on the terminal, and performs UP device switching to achieve hot backup.

The foregoing describes how the CP device uses the information about the interface on the UP device with the five cases. In some other embodiments, the information about the interface on the UP device is used in another case. For example, when sending a control packet to a terminal via a CPRi interface, the CP device adds outbound interface information to the control packet to indicate the UP device to forward data.

This embodiment provides a method in which the UP device reports information about an interface to the CP device by using PFCP. The UP device carries the information about the interface in a PFCP message, and transmits the PFCP message to the CP device. The CP device can obtain the information about the interface on the UP device from the PFCP message, which ensures that the CP device can sense the information about the interface on the UP device. Therefore, limitation on functions caused by insufficient interface information obtained by the CP device is resolved to some extent, helping the CP device implement various functions by using the information about the interface on the UP device.

The method 200 is described below by using a method 300 as an example. In the following method 300, the first PFCP message is a PFCP UP resource report, and the second PFCP message is a PFCP UP resource report. In other words, the method procedure described in the method 300 is about how a UP device reports information about an interface to a CP device by using a PFCP UP resource report and a PFCP UP resource report. It should be understood that, for similar steps in the method 300 and the method 200, refer to the method 200. Details are not described in the method 300.

Figure 26:
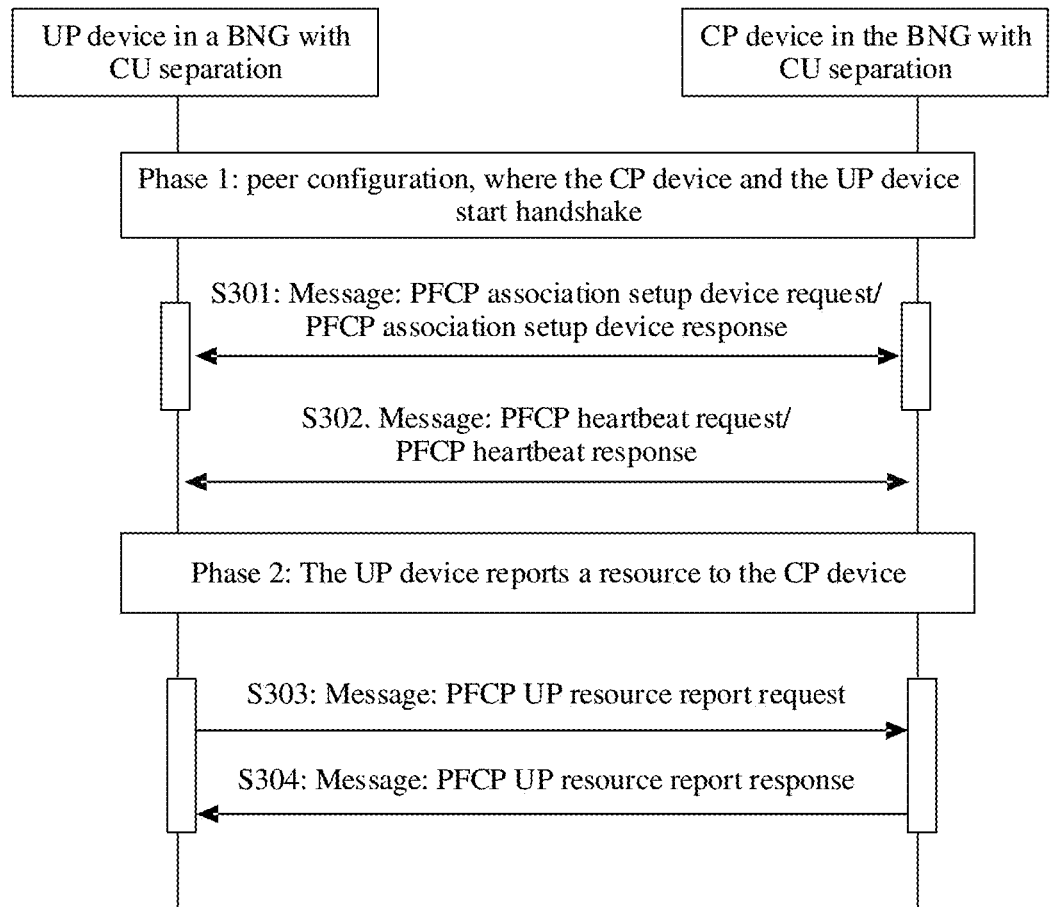
FIG. 26 is a flowchart of a communication method 300 according to an embodiment of this application.

FIG. 26 is a flowchart of a communication method 300 according to an embodiment of this application. The method 300 includes two phases. A phase 1 is a peer configuration phase. A CP device and a UP device start handshake. In a phase 2, the UP device reports a resource to the CP device, where the resource includes information about an interface on the UP device.

For example, the method 300 includes S301 to S304.

S301: The CP device transmits a PFCP association setup request to and receives a PFCP association setup response from the UP device.

S301 is an example of how the CP device establishes an association with the UP device. In some embodiments, the CP device initiates an association establishment procedure. In some embodiments, the UP device initiates an association establishment procedure. For example, the UP device initiates the association establishment procedure. The UP device generates an association setup request, and sends the association setup request to the CP device. The CP device receives the association setup request, generates an association setup response, and sends the association setup response to the UP device.

S302: The CP device transmits a PFCP heartbeat request to and receives a PFCP heartbeat response from the UP device.

S303: The UP device generates a PFCP UP resource report, and sends the PFCP UP resource report to the CP device.

S304: The CP device receives the PFCP UP resource report, generates a PFCP UP resource report response, and sends the PFCP UP resource report response to the CP device.

In the foregoing method 300, the PFCP UP resource report and the PFCP UP resource report are used as examples for description. In some other embodiments, the PFCP UP resource report in the method 300 is replaced with a PFCP node report request message. The PFCP UP resource report response in the method 300 is replaced with the PFCP node report response. For a corresponding processing procedure, refer to the method 300. Details are not described herein again.

The foregoing describes the method 200 and the method 300 in embodiments of this application. The following describes a UP device and a CP device in embodiments of this application.

The UP device and the CP device described below respectively have any function of the UP device or the CP device in the foregoing method 200 and method 300. The UP device described below corresponds to the UP device, and the CP device described below corresponds to the CP device.

Figure 27:
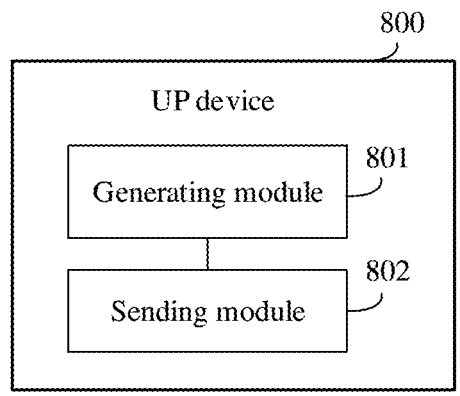
FIG. 27 is a schematic diagram of a structure of a UP device 800 according to an embodiment of this application.

FIG. 27 is a schematic diagram of a structure of a UP device 800 according to an embodiment of this application. The UP device Boo is located in a BNG in which a CP device and a UP device are separated. As shown in FIG. 27, the UP device 800 includes a generating module 801 and a sending module 802. These function modules perform corresponding functions of the UP device in the method 200 or the method 300. The generating module 801 is configured to support the UP device 800 in performing S210 or S303. The sending module 802 is configured to support the UP device 800 in performing S220 or S304.

Optionally, the generating module 801 or the sending module 802 further supports the UP device 800 in performing another process performed by the UP device 800 in the technology described in this specification. For example, the generating module 801 is configured to perform various operations related to packet generation performed by the UP device in the foregoing method embodiments. The sending module 802 is configured to perform an operation of sending a packet by the UP device in the foregoing method embodiments. For a specific execution process, refer to the detailed description of corresponding steps in the foregoing method 200 or method 300. Details are not described herein again.

It should be noted that, in embodiments of this application, division into the modules is an example, and is merely a logical function division. During actual implementation, another division manner may be used. Function modules in embodiments of this application may be integrated into one processing module, or each of the modules may exist alone physically, or two or more modules may be integrated into one module. For example, in the foregoing embodiment, the generating module 801 and the sending module 802 may be a same module or different modules. The integrated module may be implemented in a form of hardware, or may be implemented in a form of a software function module.

Figure 28:
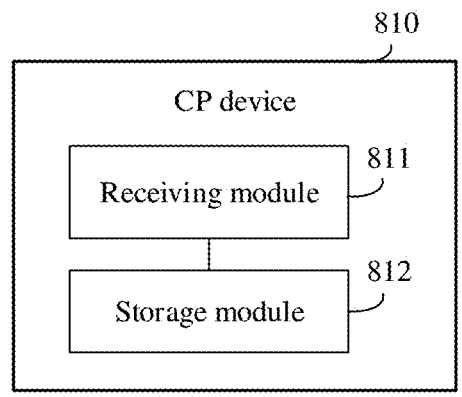
FIG. 28 is a schematic diagram of a structure of a CP device 810 according to an embodiment of this application.

FIG. 28 is a schematic diagram of a structure of a CP device 810 according to an embodiment of this application. The CP device 810 is located in a BNG in which a CP and a UP are separated, and the CP device 810 includes a receiving module 811 and a storage module 812. These function modules perform corresponding functions of the CP device in the method 200 or the method 300. The receiving module 811 is configured to support the CP device 810 in performing S230. The storage module 812 is configured to support the CP device 810 in performing S240.

Optionally, the receiving module 811 or the storage module 812 further supports the CP device 810 in performing another process performed by the CP device 810 in the technology described in this specification. For example, the receiving module 811 is configured to perform various operations that are related to packet receiving performed by the CP device in the foregoing method embodiments. The storage module 812 is configured to perform an operation of storing information by the CP device in the foregoing method embodiments. For a specific execution process, refer to the detailed description of corresponding steps in the foregoing method 200 or method 300. Details are not described herein again.

It should be noted that, in embodiments of this application, division into the modules is an example, and is merely a logical function division. During actual implementation, another division manner may be used. Function modules in embodiments of this application may be integrated into one processing module, or each of the modules may exist alone physically, or two or more modules may be integrated into one module. For example, in the foregoing embodiment, the receiving module 811 and the storage module 812 may be a same module or different modules. The integrated module may be implemented in a form of hardware, or may be implemented in a form of a software function module.

The following describes a hardware structure of the UP device or the CP device.

The device 900 or the device 1000 described below corresponds to the UP device or the CP device in the method 200 and the method 300. Hardware and modules in the device 900 or the device 1000 and the foregoing other operations and/or functions are used to implement various steps and methods implemented by the UP device or the CP device in the method embodiments. For a detailed procedure of how the device 900 or the device 1000 communicates and specific details, refer to the method 200 and the method 300. For brevity, details are not described herein again. The steps in the foregoing method 200 and method 300 are completed by using an integrated logic circuit of hardware in a processor of the device 900 and the device 1000 or by using instructions in a form of software. The steps of the methods disclosed with reference to embodiments of this application may be directly performed and completed by a hardware processor, or may be performed and completed by using a combination of hardware and software modules in the processor. A software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing methods in combination with the hardware in the processor.

The device 900 corresponds to the UP device 800 or the CP device 810, and each function module in the UP device 800 or the CP device 810 is implemented by using software of the device 900. In other words, the function modules included in the UP device 800 or the CP device 810 are generated through reading, by the processor of the device 900, program code stored in the memory.

The device 1000 corresponds to the UP device 800, and each function module in the UP device 800 is implemented by using software of the device 1000. In other words, the function modules included in the UP device 800 are generated through reading, by the processor of the device 1000, program code stored in the memory.

Figure 29:
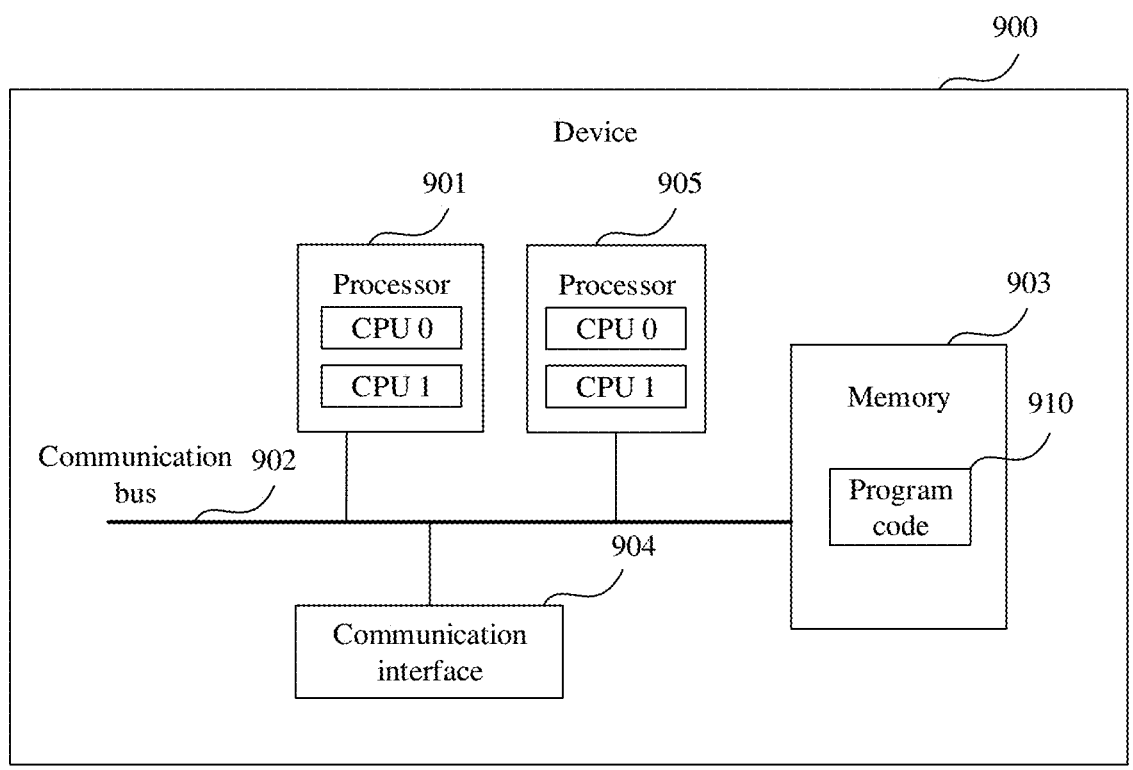
FIG. 29 is a schematic diagram of a structure of a device 900 according to an embodiment of this application.

FIG. 29 is a schematic diagram of a structure of the device 900 according to an example embodiment of this application. Optionally, the device 900 is configured to be a UP device or a CP device. In other words, the UP device or the CP device in the method 200 and the method 300 may optionally be implemented using the device 900.

The device 900 is, for example, a network device. For example, the device 900 is a switch, a router, and the like. Alternatively, the device 900 is, for example, a computing device, for example, the device 900 is a host, a server, a personal computer, and the like. The device 900 may be implemented by a general bus architecture.

The device 900 includes at least one processor 901, a communication bus 902, a memory 903, and at least one communication interface 904.

The processor 901 is, for example, a general-purpose central processing unit (CPU), a network processor (NP), a graphics processing unit (GPU), a neural network processor (NPU), a data processing unit (DPU), a microprocessor, or one or more integrated circuits configured to implement the solutions of this application. For example, the processor 901 includes an application-specific integrated circuit (ASIC), a programmable logic device (PLD), or a combination thereof. The PLD is, for example, a complex programmable logic device (CPLD), a field programmable logic gate array (FPGA), a generic array logic (GAL), or any combination thereof.

The communication bus 902 is configured to transfer information between the components. The communication bus 902 may be classified into an address bus, a data bus, a control bus, and the like. For ease of representation, only one thick line is used to represent the bus in the FIG. 29, but this does not mean that there is only one bus or only one type of bus.

The memory 903 is, for example, a read-only memory (ROM) or another type of static storage device that can store static information and an instruction, or a random access memory (RAM) or another type of dynamic storage device that can store information and instructions, or an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be used to carry or store expected program code in a form of instructions or a data structure and that can be accessed by a computer, but is not limited thereto. The memory 903, for example, exists independently, and is connected to the processor 901 by using the communication bus 902. Alternatively, the memory 903 may be integrated with the processor 901.

The communication interface 904 uses any apparatus such as a transceiver, and is configured to communicate with another device or a communication network. The communication interface 904 includes a wired communication interface, and may include a wireless communication interface. The wired communication interface may be, for example, an Ethernet interface. The Ethernet interface may be an optical interface, an electrical interface, or a combination thereof. The wireless communication interface may be a wireless local area network (WLAN) interface, a cellular network communication interface, a combination thereof, or the like.

During specific implementation, in an embodiment, the processor 901 may include one or more CPUs, for example, CPU 0 and CPU 1 shown in FIG. 29.

During specific implementation, in an embodiment, the device 900 may include a plurality of processors, such as the processor 901 and a processor 905 in FIG. 29. Each of the processors may be a single-core (single-CPU) processor or may be a multi-core (multi-CPU) processor. The processor herein may refer to one or more devices, circuits, and/or processing cores configured to process data (such as computer program instructions).

During specific implementation, in an embodiment, the device 900 may further include an output device and an input device. The output device communicates with the processor 901, and may display information in a plurality of manners. For example, the output device may be a liquid crystal display (LCD), a light emitting diode (LED) display device, a cathode ray tube (CRT) display device, a projector, or the like. The input device communicates with the processor 901, and may receive an input from a subscriber in a plurality of manners. For example, the input device may be a mouse, a keyboard, a touchscreen device, or a sensor device.

In some embodiments, the memory 903 is configured to store program code 910 for performing the solutions in this application, and the processor 901 can execute the program code 910 stored in the memory 903. That is, the device 900 may implement the communication method provided in the method embodiments by using the processor 901 and the program code 910 in the memory 903.

The device 900 in this embodiment of this application may correspond to the UP device or the CP device in the foregoing method embodiments, and the processor 901, the communication interface 904, and the like in the device 900 may implement functions of the UP device or CP device and/or various implemented steps and methods in the foregoing method embodiments. For brevity, details are not described herein.

When the UP device is implemented using the device 900, in some embodiments, the receiving module and the sending module 802 in the UP device 800 shown in FIG. 27 are equivalent to the communication interface 904 in the device 900. The generating module 801 in the UP device 800 is equivalent to the processor 901 in the device 900.

When the CP device is implemented using the device 900, in some embodiments, the sending module and the receiving module 811 in the CP device 810 shown in FIG. 28 are equivalent to the communication interface 904 in the device 900. The storage module 812 in the CP device 810 may be equivalent to the memory 903 in the device 900.

Figure 30:
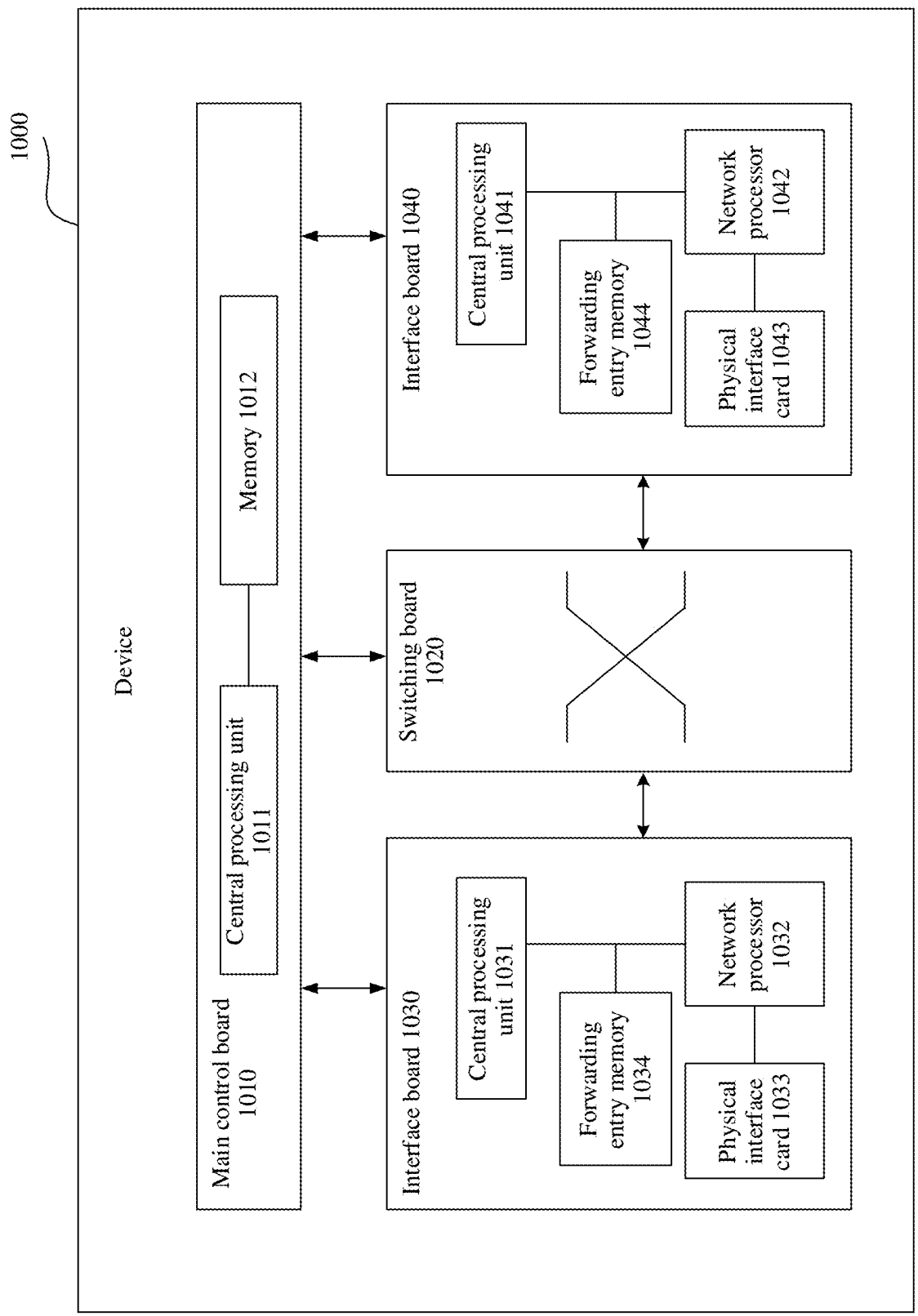
FIG. 30 is a schematic diagram of a structure of a device 1000 according to an embodiment of this application.

FIG. 30 is a schematic diagram of a structure of the device 1000 according to an example embodiment of this application. Optionally, the device 1000 is configured to be a UP device. In other words, the UP device in the method 200 and the method 300 is optionally implemented using the device 1000.

The device 1000 is, for example, a network device. For example, the device 1000 is a switch, a router, and the like. The device 1000 includes a main control board 1010 and an interface board 1030.

The main control board is also referred to as a main processing unit (MPU) or a route processing card (route processor card). The main control board 1010 is configured to control and manage components in the device 1000, including functions of route computation, device management, device maintenance, and protocol processing. The main control board 1010 includes a central processing unit 1011 and a memory 1012.

The interface board 1030 is also referred to as a line interface unit card (LPU), a line card (line card), or a service board. The interface board 1030 is configured to provide various service interfaces and forward a data packet. The service interface includes but is not limited to an Ethernet interface, a POS (Packet over SONET/SDH) interface, and the like. The Ethernet interface is, for example, a flexible Ethernet service interface (Flexible Ethernet Clients, FlexE Clients). The interface board 1030 includes a central processing unit 1031, a network processor 1032, a forwarding table memory 1034, and a physical interface card (physical interface card, PIC) 1033.

The central processing unit 1031 on the interface board 1030 is configured to control and manage the interface board 1030 and communicate with the central processing unit 1011 on the main control board 1010.

The network processor 1032 is configured to forward and process a packet. A form of the network processor 1032 may be a forwarding chip. Specifically, the network processor 1032 is configured to forward a received packet based on a forwarding table stored in the forwarding table memory 1034. If a destination address of the packet is an address of the device 1000, the network processor 1032 sends the packet to a CPU (for example, a central processing unit ion) for processing. If a destination address of the packet is not an address of the device 1000, the network processor 1032 searches for, based on the destination address, a next hop and an outbound interface corresponding to the destination address in the forwarding table, and forwards the packet to the outbound interface corresponding to the destination address. An uplink packet is processed as follows: An inbound interface on the packet is processed, and the forwarding table is searched. A downlink packet is processed as follows: The forwarding table is searched.

The physical interface card 1033 is configured to implement a physical-layer interconnection function. Original traffic enters the interface board 1030 from the physical interface card 1033, and a processed packet is sent from the physical interface card 1033. The physical interface card 1033 is also referred to as a subcard and may be installed on the interface board 1030, and is responsible for converting an optoelectronic signal into a packet, performing validity check on the packet, and then forwarding the packet to the network processor 1032 for processing. In some embodiments, the central processing unit may alternatively perform a function of the network processor 1032, for example, implement software forwarding based on a general CPU. Therefore, the network processor 1032 is not necessary in the physical interface card 1033.

Optionally, the device 1000 includes a plurality of interface boards. For example, the device 1000 further includes an interface board 1040, and the interface board 1040 includes a central processing unit 1041, a network processor 1042, a forwarding entry memory 1044, and a physical interface card 1043.

Optionally, the device 1000 further includes a switching board 1020. The switching board 1020 may also be referred to as a switch fabric unit (SFU). When the network device has a plurality of interface boards 1030, the switching board 1020 is configured to complete data exchange between the interface boards. For example, the interface board 1030 and the interface board 1040 may communicate with each other by using the switching board 1020.

The main control board 1010 is coupled to the interface board 1030. For example, the main control board 1010, the interface board 1030 and the interface board 1040, and the switching board 1020 are connected to a system backboard through a system bus for interworking. In a possible implementation, an inter-process communication (inter-process communication, IPC) channel is established between the main control board 1010 and the interface board 1030, and the main control board 1010 and the interface board 1030 communicate with each other through the IPC channel.

Logically, the device 1000 includes a control plane and a forwarding plane. The control plane includes the main control board 1010 and the central processing unit 1031. The forwarding plane includes components that perform forwarding, such as the forwarding entry memory 1034, the physical interface card 1033, and the network processor 1032. The control plane performs the following functions: a router, generating a forwarding table, processing signaling and a protocol packet, configuring and maintaining a device status, and the like. The control plane delivers the generated forwarding table to the forwarding plane. On the forwarding plane, the network processor 1032 searches the forwarding table delivered by the control plane, and then forwards, based on the table, a packet received by the physical interface card 1033. The forwarding table delivered by the control plane may be stored in the forwarding entry memory 1034. In some embodiments, the control plane and the forwarding plane may be totally separated, and are not on a same device.

The following briefly describes the method 200 and the method 300 with reference to the device 1000.

The central processing unit 1031 generates a first PFCP message based on an interface on the physical interface card 1033, and sends the first PFCP message from the physical interface card 1033 based on information such as an outbound interface after completing link layer encapsulation, so that the first PFCP message is transmitted to the CP device.

When the UP device is implemented using the device 1000, in some embodiments, the receiving module and the sending module 802 in the UP device 800 shown in FIG. 27 are equivalent to the physical interface card 1033 in the device 1000. The generating module 801 in the UP device 800 is equivalent to a network processor 1032, the central processing unit 1031, or the central processing unit 1011.

It should be understood that in this embodiment of this application, an operation on the interface board 1040 is the same as an operation on the interface board 1030. For brevity, details are not described again. It should be understood that, the device 1000 in this embodiment may correspond to the UP device in the foregoing method embodiments, and the main control board 1010, the interface board 1030, and/or the interface board 1040 in the device 1000 may implement functions of the UP device in the foregoing method embodiments and/or various steps implemented by the UP device in the foregoing method embodiments. For brevity, details are not described herein again.

It should be noted that, there may be one or more main control boards. When there are a plurality of main control boards, the main control boards may include an active main control board and a standby main control board. There may be one or more interface boards, and a network device having a stronger data processing capability provides more interface boards. There may also be one or more physical interface cards on the interface board. There may be no switching board or one or more switching boards. When there are a plurality of switching boards, load sharing and redundancy backup may be implemented by the switching boards together. In a centralized forwarding architecture, the network device may not need the switching board, and the interface board provides a function of processing service data of an entire system. In a distributed forwarding architecture, the network device may have at least one switching board, and data exchange between a plurality of interface boards is implemented by using the switching board, to provide a large-capacity data exchange and processing capability. Therefore, a data access and processing capability of a network device in the distributed architecture is better than that of a device in the centralized architecture. Optionally, the network device may alternatively be in a form in which there is only one card. To be specific, there is no switching board, and functions of the interface board and the main control board are integrated on the card. In this case, the central processing unit on the interface board and the central processing unit on the main control board may be combined into one central processing unit on the card, to perform functions obtained after the two central processing units are combined. The device in this form (for example, a network device such as a low-end switch or router) has a relatively weak data exchange and processing capability. A specific architecture to be used depends on a specific networking deployment scenario, and is not limited herein.

Figure 31:
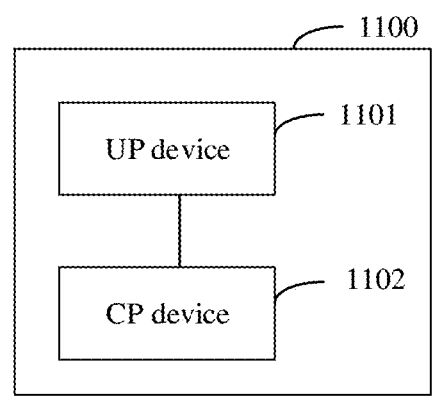
FIG. 31 is a schematic diagram of a structure of a network system 1100 according to an embodiment of this application.

Refer to FIG. 31. An embodiment of this application provides a network system 1100. The network system 1100 includes a UP device 1101 and a CP device 1102. Optionally, the UP device 1101 is the UP device 800 shown in FIG. 27, the device 900 shown in FIG. 29, or the device 1000 shown in FIG. 30. The CP device 1102 is the CP device 810 shown in FIG. 28 or the device 900 shown in FIG. 29.

A person of ordinary skill in the art may be aware that, in combination with the examples described in embodiments disclosed in this specification, method steps and modules can be implemented by electronic hardware, computer software, or a combination thereof. To clearly describe the interchangeability between the hardware and the software, the foregoing has generally described steps and composition of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, device, and module, refer to a corresponding process in the foregoing method embodiment, and details are not described herein.

In the several embodiments provided in this application, it should be understood that the disclosed system, device, and method may be implemented in other manners. For example, the described device embodiment is merely an example. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented through some interfaces. Indirect couplings or communication connections between the devices or modules may be electrical connections, mechanical connections, or connections in other forms.

The modules described as separate parts may or may not be physically separate, and parts displayed as modules may or may not be physical modules, may be located in one position, or may be distributed on a plurality of network modules. Some or all of the modules may be selected according to actual needs to achieve the objectives of the solutions of embodiments of this application.

In addition, function modules in embodiments of this application may be integrated into one processing module, or each of the modules may exist alone physically, or two or more modules may be integrated into one module. The integrated module may be implemented in a form of hardware, or may be implemented in a form of a software function module.

When the integrated module is implemented in the form of a software function module and sold or used as an independent product, the integrated module may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the method in embodiments of this application. The storage medium includes: any medium that can store program code, such as a USB flash drive, a removable hard disk, a read-only memory (read-only memory, ROM), a random access memory (random access memory, RAM), a magnetic disk, or an optical disc.

In embodiments of this application, terms such as "first" and "second" are used to distinguish same items or similar items that have basically same functions. It should be understood that there is no logical or time sequence dependency between "first" and "second", and a quantity and an execution sequence are not limited. It should also be understood that although terms such as first and second are used in the following description to describe various elements, these elements should not be limited by the terms. These terms are merely used to distinguish one element from another element. For example, first information may be referred to as second information, and similarly, second information may be referred to as first information without departing from the scope of the various examples. Both the first information and the second information may be information, and in some cases may be separate and different information.

In this application, "at least one" means one or more and "a plurality of" means two or more. Terms "system" and "network" may be used interchangeably in this specification.

It should be further understood that the term "if" may be interpreted as a meaning "when" ("when" or "upon"), "in response to determining", or "in response to detecting". Similarly, according to the context, the phrase "if it is determined that" or "if (a stated condition or event) is detected" may be interpreted as a meaning of "when it is determined that" or "in response to determining" or "when (a stated condition or event) is detected" or "in response to detecting (a stated condition or event)".

The foregoing descriptions are merely specific implementations of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

All or some of the foregoing embodiments may be implemented through software, hardware, firmware, or any combination thereof. When the software is used to implement the embodiments, all or some of the embodiments may be implemented in a form of a computer program product. The computer program product includes one or more computer program instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired or wireless manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (digital video disc, DVD)), a semiconductor medium (for example, a solid-state drive), or the like.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A user plane (UP) device, comprising:
   at least one processor; and
   a non-transitory computer readable storage medium storing a program that is executable by the at least one processor, the program including instructions to cause the UP device to perform:
   generating a first packet forwarding control protocol (PFCP) message based on an interface on the UP device, wherein the first PFCP message comprises information about the interface, the interface comprises a first interface accessed by a terminal on the UP device, and the information about the interface comprises an index identifying the interface; and
   sending, by the UP device, the first PFCP message to a control plane (CP) device, wherein the UP device and the CP device are located in a network in which a CP and a UP are separated.

2. The UP device according to claim 1, wherein the first PFCP message comprises an interface index information element (IE), and the interface index IE comprises the index of the interface.

3. The UP device according to claim 1, wherein the information about the interface further comprises a type of the interface, wherein the type of the interface is a physical interface, a link aggregation bundled interface, a virtual Ethernet interface, or a tunnel interface, wherein the first PFCP message comprises an interface type information element (IE), and the interface type IE comprises information indicating the type of the interface.

4. The UP device according to claim 1, wherein the information about the interface further comprises a bandwidth of the interface, the first PFCP message comprises a bandwidth information element (IE), and the bandwidth IE comprises the bandwidth of the interface.

5. The UP device according to claim 1, wherein the information about the interface further comprises a slot number of a slot in which the interface is located, the first PFCP message comprises a slot information element (IE), and the slot IE comprises the slot number.

6. The UP device according to claim 1, wherein the information about the interface further comprises a card number of an interface card on which the interface is located, the first PFCP message comprises a card information element (IE), and the card IE comprises the card number.

7. The UP device according to claim 1, wherein the information about the interface further comprises a port number corresponding to the interface, the first PFCP message comprises a port information element (IE), and the port IE comprises the port number.

8. The UP device according to claim 1, wherein the information about the interface further comprises an index of a sub-interface of the interface, the first PFCP message comprises a sub-interface index information element (IE), and the sub-interface index IE comprises the index of the sub-interface.

9. The UP device according to claim 1, wherein the interface is a logical interface, the information about the interface further comprises an interface number of the logical interface, the first PFCP message comprises a logical interface index information element (IE), and the logical interface index IE comprises the interface number of the logical interface.

10. The UP device according to claim 1, wherein:
the network comprises a broadband network gateway (BNG), and the BNG comprises the CP device and the UP device; or the network comprises a broadband remote access server (BRAS), and the BRAS comprises the CP device and the UP device.

11. A control plane (CP) device, comprising:
at least one processor; and
a non-transitory computer readable storage medium storing a program that is executable by the at least one processor, the program including instructions to cause the CP device to perform:
receiving a first packet forwarding control protocol (PFCP) message from a user plane (UP) device, wherein the first PFCP message comprises information about an interface on the UP device, and the information about the interface comprises an index identifying the interface, the interface comprises a first interface accessed by a terminal on the UP device, and wherein the UP device and the CP device are located in a network in which a CP and a UP are separated; and
storing the information about the interface.

12. The CP device according to claim 11, wherein the program further includes instructions to cause the CP device to perform:
after storing the information about the interface, managing the terminal based on the information about the first interface.

13. The CP device according to claim 11, wherein the program further includes instructions to cause the CP device to perform:
after receiving the first PFCP message from the UP device, generating a second PFCP message, wherein the second PFCP message notifies the UP device that the CP device has received the first PFCP message; and
sending, by the CP device, the second PFCP message to the UP device.

14. The CP device according to claim 11, wherein the first PFCP message comprises an interface index information element (IE), and the interface index IE comprises the index of the interface.

15. The CP device according to claim 11, wherein the information about the interface further comprises a type of the interface, wherein the type of the interface is a physical interface, a link aggregation bundled interface, a virtual Ethernet interface, or a tunnel interface, wherein the first PFCP message comprises an interface type information element (IE), and the interface type IE comprises information indicating the type of the interface.

16. The CP device according to claim 11, wherein the information about the interface further comprises a bandwidth of the interface, the first PFCP message comprises a bandwidth information element (IE), and the bandwidth IE comprises the bandwidth of the interface.

17. The CP device according to claim 11, wherein the information about the interface further comprises a slot number of a slot in which the interface is located, the first PFCP message comprises a slot information element (IE), and the slot IE comprises the slot number.

18. The CP device according to claim 11, wherein the information about the interface further comprises a card number of an interface card on which the interface is located, the first PFCP message comprises a card information element (IE), and the card IE comprises the card number.

19. The CP device according to claim 11, wherein the information about the interface further comprises a port number corresponding to the interface, the first PFCP message comprises a port information element (IE), and the port IE comprises the port number.

20. A network system in which a control plane (CP) and a user plane (UP) are separated, the network system comprises a CP device and a UP device,
wherein the UP device is configured to:
generate a first packet forwarding control protocol (PFCP) message based on an interface on the UP device, wherein the first PFCP message comprises information about the interface, the interface comprises a first interface accessed by a terminal on the UP device, and the information about the interface comprises an index identifying the interface; and
send the first PFCP message to the CP device;
wherein the CP device is configured to:
receive the first PFCP message from the UP device; and
store the information about the interface; and
wherein the network system comprises a broadband network gateway (BNG) or a broadband remote access server (BRAS).

* * * * *